United States Patent
Sela et al.

(10) Patent No.: US 9,818,216 B2
(45) Date of Patent: Nov. 14, 2017

(54) AUDIO-BASED CARICATURE EXAGGERATION

(71) Applicant: Technion Research and Development Foundation Limited, Haifa (IL)

(72) Inventors: Matan Sela, Haifa (IL); Yonathan Aflalo, Tel Aviv (IL); Ron Kimmel, Haifa (IL)

(73) Assignee: Technion Research and Development Foundation Limited, Haifa (IL)

( * ) Notice: Subject to any disclaimer, the term of this patent is extended or adjusted under 35 U.S.C. 154(b) by 12 days.

(21) Appl. No.: 14/680,374

(22) Filed: Apr. 7, 2015

(65) Prior Publication Data

US 2015/0287229 A1    Oct. 8, 2015

Related U.S. Application Data

(60) Provisional application No. 61/976,510, filed on Apr. 8, 2014.

(51) Int. Cl.
*G06T 13/20*    (2011.01)
*G06T 13/40*    (2011.01)
(52) U.S. Cl.
CPC ............ *G06T 13/205* (2013.01); *G06T 13/40* (2013.01)
(58) Field of Classification Search
None
See application file for complete search history.

(56) References Cited

U.S. PATENT DOCUMENTS

| 9,387,394 B1* | 7/2016 | Johnson ................ A63F 13/00 |
| 2003/0110026 A1* | 6/2003 | Yamamoto ............ G06T 13/205 |
| | | 704/207 |
| 2006/0028466 A1* | 2/2006 | Zhou .................... G06T 17/205 |
| | | 345/420 |
| 2009/0002376 A1* | 1/2009 | Xu ........................ G06T 13/40 |
| | | 345/473 |
| 2009/0002479 A1* | 1/2009 | Sangberg .............. H04N 7/147 |
| | | 348/14.02 |
| 2015/0371661 A1* | 12/2015 | Chapman ............... A63F 13/12 |
| | | 704/270 |

OTHER PUBLICATIONS

Lewiner, Thomas, et al. "Interactive 3D caricature from harmonic exaggeration." Computers & Graphics 35.3 (2011): 586-595.*
Mokhtarian, Farzin, Nasser Khalili, and Peter Yuen. "Multi-scale free-form 3D object recognition using 3D models." Image and Vision Computing 19.5 (2001): 271-281.*

(Continued)

*Primary Examiner* — Yu Chen
(74) *Attorney, Agent, or Firm* — Roach Brown McCarthy & Gruber, P.C.; Kevin D. McCarthy

(57) ABSTRACT

Computerized, audio-based caricature exaggeration which includes: receiving a three-dimensional model of an object; receiving an audio sequence; generating a video frame sequence, said generating comprising computing a caricature of the object, wherein (a) the computing is with a different exaggeration factor for each of multiple ones of the video frames, and (b) the different exaggeration factor is based on one or more parameters of the audio sequence; and synthesizing the audio sequence and the video frame sequence into an audiovisual clip.

16 Claims, 17 Drawing Sheets

(56) References Cited

OTHER PUBLICATIONS

Gaussian Curvature,(https://web.archive.org/web/20140124165340/http://en.wikipedia.org/wiki/Gaussian_curvature, Dated Jan. 24, 2014).*
Curvature, (https://web.archive.org/web/20140227010747/https://en.wikipedia.org/wiki/Curvature, Dated Feb. 27, 2014).*
Ray Kurzweil, How to Create a Mind, The Secret of Human Thought Revealed, Feb. 28, 2013, pp. 76-77.
Ray Kurzweil, How to Create a Mind, The Secret of Human Thought Revealed, Feb. 28, 2013, pp. 139-141.
Alexander M. Bronstein. Michael M. Bronstein, Ron Kimmel Expression-invariant representations of faces, Manuscript revised Mar. 7, 2006, pp. 1-10.
Susan E. Brennan, Caricature Generator: The Dynamic Exaggeration of Faces by Computer, Leonardo, vol. 18, No. 3, (1985), pp. 170-178.
Volker Blanz,Thomas Vetter A Morphable Model for the Synthesis of 3D Faces, Max-Planck-Institut fur biologische Kybernetik, Tubingen, Germany, pp. 1-8 (1999).
Ergun Akleman, James Palmer, Ryan Logan, Making Extreme Caricatures with a New Interactive 2D Deformation Techniquewith Simplicial Complexes, Sep. 2000, pp. 1-12.
Lyndsey Clarke, Min Chen and Benjamin Mora, Automatic Generation of 3D Computer Caricatures based on Artistic Deformation Styles, Report # CSR 16-2008, pp. 1-10.
Ami Steiner, Ron Kimmel and Alfred M. Bruckstein, Planar Shape Enhancement and Exaggeration, Oct. 29, 1997, pp. 1-13.
Stanley Osher, James A. Sethian, Fronts Propagating with Curvature Dependent Speed: Algorithms Based on Hamilton-Jacobi Formulations, Journal of Computational Physics, 79, pp. 12-49, (1988).
Michael Eigensatz Robert W. Sumner Mark Pauly, Curvature-Domain Shape Processing, vol. 27 (2008), No. 2, pp. 1-10.
ByungMoon Kim Jarek Rossignac, GeoFilter: Geometric Selection of Mesh Filter Parameters, vol. 24 (2005), No. 3, pp. 1-8.
Thomas Lewiner, Thales Vieira, Dimas Martinez, Adelailson Peixoto, Vinicius Mello and Luiz Velho, Interactive 3D Caricature from Harmonic Exaggeration, Mar. 11, 2011, pp. 1-12.
Yizhou Yu, Kun Zhou, Dong Xu, Xiaohan Shi, Hujun Bao, Baining Guo, Heung-Yeung Shum, Mesh Editing with Poisson-Based Gradient Field Manipulation, ACM SIGGRAPH 2004 conference proceedings, pp. 1-8.
Ming Chuang, Michael Kazhdan, Interactive and Anisotropic Geometry Processing Using the Screened Poisson Equation, pp. 1-10 (2011).
Mario Botsch, Leif Kobbelt, An Intuitive Framework for Real-Time Freeform Modeling, pp. 1-5 (2004).
Olga Sorkine, Daniel Cohen-Or, Yaron Lipman, Marc Alexa, Christian Rossl and Hans-Peter Seidel, Laplacian Surface Editing, pp. 1-10 (2004).
Mario Botsch, Olga Sorkine, On Linear Variational Surface Deformation Methods, pp. 1-18 (2007.
Thibaut Weise, Hao Li, Luc Van Gool, Mark Pauly,Face/Off: Live Facial Puppetry, The Eurographics Association 2009, pp. 1-10.
Yiying Tong, Santiago Lombeyda, Anil N. Hirani, Mathieu Desbrun, Discrete Multiscale Vector Field Decomposition, pp. 1-8 (2003).
Mark Meyer, Mathieu Desbrun, Peter Schroder and Alan H. Barr, Discrete Differential-Geometry Operators for Triangulated 2-Manifolds, pp. 1-26 (2002).
Tatiana Surazhsky, Evgeny Magid, Octavian Soldea, Gershon Elber and Ehud Rivlin, A Comparison of Gaussian and Mean Curvatures Estimation Methods on Triangular Meshes, pp. 1-6 (2003).
David Cohen-Steiner, Jean-Marie Morvan, Restricted Delaunay Triangulations and Normal Cycle, Jun. 8-10, 2003, pp. 1-10.
Ulrich Pinkall, Konrad Polthier, Computing Discrete Minimal Surfaces and Their Conjugates, Feb. 1993, pp. 1-28.
Mario Botsch, Robert W. Sumner, Mark Pauly, Markus Gross, Deformation Transfer for Detail-Preserving Surface Editing, pp. 1-8 (2006).
Robert W. Sumner, Jovan Popovic, Deformation Transfer for Triangle Meshes, SIGGRAPH 2004, pp. 1-7.
David Harmon, Daniele Panozzo, Olga Sorkine, Denis Zorin, Interference-Aware Geometric Modeling, pp. 1-10 (2011).

* cited by examiner

AUDIO-BASED CARICATURE EXAGGERATION

CROSS-REFERENCE TO RELATED APPLICATIONS

This application claims the benefit of U.S. Provisional Patent Application No. 61/976,510, entitled "Audio-Based Caricature Exaggeration", filed Apr. 8, 2014, the contents of which are incorporated herein by reference in their entirety.

BACKGROUND

A caricature is often defined as an illustration of an object (e.g. a person, an animal or even an inanimate object) in which some features are exaggerated (also "enhanced" or "emphasized") while others are de-emphasized (also "oversimplified"). Artistically, caricatures are many times targeted at creating a comic or grotesque effect.

Some of the earliest caricatures are found in the works of Leonardo da Vinci, who actively sought people with deformities to use as models. The point was to offer an impression of the original which was more striking than a traditional portrait.

Caricaturization, traditionally, has been a wholly-manual task performed by skilled artists or hobbyists. However, the past few decades have seen many attempts to computerize the process of converting an image or a model of a certain object into a caricature.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment relates to a method comprising using at least one hardware processor for: receiving a three-dimensional model of an object; receiving an audio sequence; generating a video frame sequence, said generating comprising computing a caricature of the object, wherein (a) the computing is with a different exaggeration factor for each of multiple ones of the video frames, and (b) the different exaggeration factor is based on one or more parameters of the audio sequence; and synthesizing the audio sequence and the video frame sequence into an audiovisual clip.

Another embodiment provides a computer program product comprising a non-transitory computer-readable storage medium having program code embodied thereon, the program code executable by at least one hardware processor for: receiving a three-dimensional model of an object; receiving an audio sequence; generating a video frame sequence, said generating comprising computing a caricature of the object, wherein (a) the computing is with a different exaggeration factor for each of multiple ones of the video frames, and (b) the different exaggeration factor is based on one or more parameters of the audio sequence; and synthesizing the audio sequence and the video frame sequence into an audiovisual clip.

Yet a further embodiment provides a system comprising: (1) a non-transitory computer-readable storage medium having program code embodied thereon, the program code comprising instructions for: receiving a three-dimensional model of an object, receiving an audio sequence, generating a video frame sequence, wherein the generating comprises computing a caricature of the object, wherein (a) the computing is with a different exaggeration factor for each of multiple ones of the video frames, and (b) the different exaggeration factor is based on one or more parameters of the audio sequence, and synthesizing the audio sequence and the video frame sequence into an audiovisual clip; and (2) at least one hardware processor configured to execute the instructions.

In some embodiments, the method further comprises using the at least one hardware processor for determining the one or more parameters for each of multiple periods of the audio sequence.

In some embodiments, the one or more parameters are selected from the group consisting of: amplitude, frequency and tempo.

In some embodiments, the program code is further executable by said at least one hardware processor for determining the one or more parameters for each of multiple periods of the audio sequence; and the one or more parameters are selected from the group consisting of: amplitude, frequency and tempo.

In some embodiments, the generating further comprises altering a view angle of the caricature along the video frame sequence.

In some embodiments, the three-dimensional model comprises a polygon mesh representation of the object.

In some embodiments, the exaggeration factor is applied uniformly, to the entirety of the three-dimensional model.

In some embodiments, the exaggeration factor is applied non-uniformly, only to one or more portions of the three-dimensional model, which portions amount to less than the entirety of the three-dimensional model.

In some embodiments, the computing of the caricature of the object comprises: constructing a look-up table comprised of (a) different visualizations of the caricature, each computed with one of the different exaggeration factors, and (b) the exaggeration factor for each of the different visualizations; and using each caricature visualization from the look-up table when the exaggeration factor of that caricature visualization is determined to be suitable for the one or more parameters of the audio sequence.

In some embodiments, the computing of the caricature of the object comprises: scaling gradient fields of surface coordinates of the three-dimensional model by a function of a Gaussian curvature of the surface; and finding a regular surface whose gradient fields fit the scaled gradient fields.

In some embodiments, the computing of the caricature of the object further comprises amplifying the scaling according to local discrepancies between the object and a reference object.

In some embodiments, the computing of the caricature of the object further comprises amplifying the scaling according to local discrepancies between the object and a scaled down version of the object.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIG. 15A shows the results of Multidimensional Scaling of geodesic distance matrices for additional uncaricaturized 3D shapes of.

DETAILED DESCRIPTION

Figure 1:
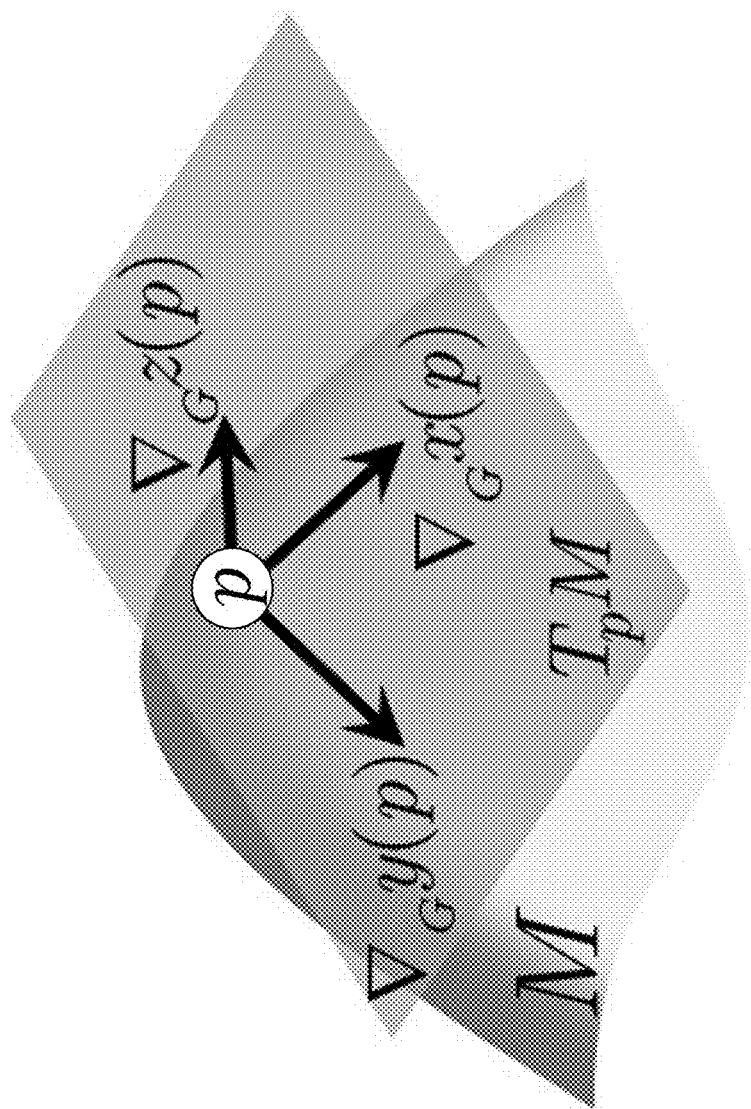
FIG. 1 shows a depiction of gradient fields of coordinate functions at each point on a surface residing on a tangent plane.

Disclosed herein is a method for audio-based caricature exaggeration. The method may result in an audiovisual clip having a video channel and an audio channel; the audio channel may include an audio sequence, whereas the video channel may include a video frame sequence depicting a caricature of a certain object, wherein the caricature visually changes over time based on one or more audio parameters of the audio sequence.

The visual change to the caricature along the audiovisual clip may be bidirectional or unidirectional. A bidirectional change may include alternating periods of increasing and decreasing exaggeration of the caricature along the audiovisual clip. Conversely, a unidirectional change may include either an increasing or a decreasing exaggeration of the caricature along the entire length of audiovisual clip.

Such temporal changes to the visualization of the caricature may include a change to an exaggeration of one or more features of the object, and/or a change to a de-emphasis of one or more features of the object. Merely as an illustrative example, the resulting audiovisual clip may include a caricature of a woman's face, where the size of her nose and ears changes with some correspondence to audible changes in the music of the clip.

Accordingly, the method for audio-based caricature exaggeration, which yields an audiovisual clip, may include some or all of the following steps:

In one step of the method, a three-dimensional (3D) model of an object may be received. Examples of such an object include a whole or a partial human body (e.g. a human head, a complete human figure, etc.), an animal figure, a figure of an inanimate object, etc. The 3D model may be received, for example, as a digital file including a 3D polygon (e.g. triangle) mesh representing the object, as known in the art.

In another step of the method, an audio sequence may be received, in the form of a digital audio file. The audio sequence may include, for example, a musical composition, a song, speech, or any combination thereof. The audio sequence may serve as an audio channel of the audiovisual clip.

A further step of the method may include generating a video frame sequence, to serve as a video channel of the audiovisual clip. This step may include multiple discrete computations performed on the 3D model, each yielding a caricature visualization having a different level of exaggeration. Each of these computations may include applying a computerized caricaturization algorithm to the 3D model. An exemplary suitable algorithm, referred to as "Intrinsic Surface Caricaturization", is disclosed below. However, those of skill in the art will recognize that other computerized caricaturization algorithms may be suitable for yielding caricature visualizations with different levels of exaggeration. Generally, any computerized caricaturization algorithm which allows adjusting the level of exaggeration of the resulting caricature may be suitable for the purpose of generating the present video frame sequence.

In the Intrinsic Surface Caricaturization algorithm, adjusting the level of exaggeration may be achieved by adjusting an exaggeration factor, termed $\gamma$ (Gamma). Namely, in each of the multiple discrete computations performed on the 3D model, a different $\gamma$ value ($\gamma \in [0,1]$) may be used.

The $\gamma$ value may be adjusted either for the entirety of the 3D model, or for one or more specific portions thereof, which amount to less than the entirety of the model. In the latter case, the object may be exaggerated non-uniformly; one or more specific portions of the object may be exaggerated while others remain static. This may be achieved by setting the exaggeration factor non-uniformly over the 3D model of the object; a portion which is desired to remain static may have an exaggeration factor of zero or close to zero, while the rest of the 3D model may have an exaggeration factor relatively distant from zero, e.g. 0.25, 0.5, 0.75, 1, etc. With regard to the Intrinsic Surface Caricaturization algorithm, those of skill in the art will recognize that $\gamma$ values may be differently set for different portions of the 3D model.

Optionally, the user may manually specify the portion(s) of the 3D model to be exaggerated, such as by marking, using a graphical user interface (GUI), one or more points, triangles or the like in the 3D model.

Practically, the generation of the video frame sequence may include a preliminary process of constructing a look-up table comprised of different caricature visualizations and the $\gamma$ value for each. The look-up table may be predetermined to include a certain number of caricatures, e.g. 10 caricatures, 50 caricatures, 100 caricatures, etc. The number of caricatures in the look-up table may, naturally, imply the $\gamma$ value increments of the multiple computations. However, these increments are not necessarily equal, and it is possible, if desired, to produce caricatures with a non-liner γ value incrementation.

After the look-up table is constructed, the caricatures it contains may be conveniently used for generating the frames of the video frame sequence, by using a certain caricature visualization from the look-up table when its γ value is determined to be suitable for one or more audio parameters of the audio sequence, at a certain point in time or during a certain time period.

As an alternative to constructing a look-up table, a computation with a desired γ value may be performed ad-hoc, for each video frame, based on the one or more audio parameters corresponding to that frame. If this approach is used, a caricature with a certain γ value may be re-used for a later frame if needed, without repeating the same computation for that later frame.

In the generation of the video frame sequence, the level of caricature exaggeration may be synchronized with the audio sequence in the following manner: For each period of time in the audio sequence (e.g. a few milliseconds, a few dozen milliseconds, a few hundred milliseconds, or any different period of time defined by a user), one or more audio parameters of that period in the audio sequence may be determined, by analyzing the audio sequence. Such audio parameters may include, for example:

A. Amplitude (also "volume") of the audio sequence during the pertinent period of time. This may be, for example, a dominant, median or average amplitude over the pertinent period of time. The amplitude may relate to the entire frequency spectrum present during the pertinent period of time, or to a specific band of frequencies.

B. Sound frequency (also "pitch") of the audio sequence during the pertinent period of time. This may be, for example, a dominant, median or average frequency over the pertinent period of time.

Those of skill in the art will recognize that any other human-audible feature of the audio sequence may serve as such a parameter, such that the caricature changes upon the human hearing such feature.

In addition or as an alternative to determining the one or more audio parameters for every period of time in the audio sequence, a global audio parameter pertaining to the entirety of the audio sequence (or to an extended section thereof, e.g. 10 seconds or more) may be determined, and be used for the synchronization. An example of such global audio parameter is tempo; the tempo, denoted, for example, in beats per minute (BPM), may be used for determining a frequency of changing the visualization of the caricature. The frequency of chancing the visualization of the caricature may be determined as an integer multiple of the BPM. For example, if the BPM is 100, the visualization of the caricature may be changed 100 times per minute, 200 times per minute, 300 times per minute, and so on and so forth.

After determining the one or more audio parameters for every period of time in the audio sequence, one or more video frames may be generated, to be associated with that period of time. For example, if it is desired to produce an audiovisual clip having a frame rate of 25 frames per second (FPS), which translates into 40 milliseconds per frame; and the length of each of the aforementioned periods of time is 80 milliseconds, then two frames have to be generated for each such period of time.

As noted above, the one or more video frames which are generated per period of time in the audio sequence may include a caricature visualization having a level of exaggeration which corresponds to a level of the one or more audio parameters. To that end, the audio sequence may be pre-analyzed, to determine how the level of the one or more audio parameters changes during the audio sequence. These changes may then be encoded on a scale which correlates to the scale of the exaggeration factor, for example between 0 and 1. This may make it convenient to select a level of exaggeration which corresponds to the level of the one or more audio parameters.

It should be noted that the computation of a caricature visualization need not be necessarily carried out for all frames in the video channel. It is possible to compute a caricature visualization only once every few frames, and generate the frames in between using morphing techniques known in the field of digital video.

It should also be noted that, in order for the resulting video channel to have a smooth, appealing appearance to a viewer, the computation of the caricature visualizations of different levels may be performed not based on the audio sequence itself, but rather on a smoother version thereof. That is, the audio sequence may be averaged, for example by using a low pass filter, such that the change in the one or more audio parameters along the averaged version of the audio sequence becomes more subtle (i.e. of a slower pace). This will cause the resulting video channel to include caricature visualizations whose temporal changing is smoother and less bothering.

In an optional step of the method, a view angle of the caricature along the video frame sequence may also be changed, either based on the one or more audio parameters or based on some user preference unrelated to the one or more audio parameters. To achieve this, the caricaturization algorithm may be separately applied to different postures of the 3D model of the object. The result may be, for example, a video channel in which the caricature both changes its exaggeration level and is shown from different angles (e.g. if the caricature is of a human head, the head may also rotate during playing of the video channel).

In a further step of the method, the audio sequence and the video frame sequence may be synthesized into an audiovisual clip. Namely, the audio sequence and the video frame sequence may be joined together, into a single file, as known in the art.

In an optional step of the method, the audiovisual clip may undergo post-processing, for example in order to compress its audio sequence and/or it video frame sequence. This optional step may employ one or more of audio and/or video encoding algorithms known in the art.

The audiovisual clip produced according to the present method may show smooth, appealing transformations between such caricature visualizations having different exaggeration factors (and/or between an original and caricatures of the original)—while the audio sequence is playing in the background. One possible use of such audiovisual clips is for entertainment purposes. Other possible uses will become apparent to those of skill in the art.

Intrinsic Surface Caricaturization

1. Surface Enhancement
1.1. Notations
Consider the boundary of a 3D shape as a surface or a two dimensional manifold $M \subset \mathbb{R}^3$ given in a parametric form as $S: \Omega \subset \mathbb{R}^2 \rightarrow M$. Throughout this exposition, the surface M will be described by its coordinates $S(u, v) = \{x(u, v), y(u, v), z(u, v)\}$, where x, y and z are the coordinate-functions of the manifold.

The first partial derivatives of the parametric form, $S_u$ and $S_v$, are two vectors that are tangent to the surface and linearly independent. Thus, one can set the basis for the tangent plane $T_pM$, about a point $p \in S$ on the surface, as $\{S_u, S_v\}$.

The Jacobian of the parametrization J is a 3×2 matrix whose columns are $S_u$ and $S_v$, respectively. We define the matrix $G = J^T J$ as the regular metric of the surface. Clearly, G is invertible, positive definite, and can be written explicitly in terms of $S_u$ and $S_v$ as $$G = \begin{pmatrix} \langle S_u, S_u \rangle & \langle S_u, S_v \rangle \\ \langle S_v, S_u \rangle & \langle S_v, S_v \rangle \end{pmatrix}. \quad (1)$$

Since the basis $\{S_u, S_v\}$ is not necessarily orthogonal, the inner product between two vectors $\underline{a}, \underline{b} \in T_pM$ represented in this basis is given by $$\langle \underline{a}, \underline{b} \rangle_G = \underline{a}^T G \underline{b}. \quad (2)$$

Next, consider two surfaces $M_1$ and $M_2$, and suppose we are given a parametrization for the first surface $S_1(u,v)$. Suppose we are given a bijective map between the surfaces $\phi: M_1 \to M_2$. We can then build a parametrization for the second surface $M_2$ by composing $\phi$ on $S_1$. That is, a parametrization for the second surface is given by $$S_2(u,v) = \phi \circ S_1(u,v). \quad (3)$$

Given the parametrizations for both surfaces, we can calculate the metric matrices, $G_1$ and $G_2$, at each point (u, v) in the parametrization domain, see Eq. (1). If at each point (u, v) in the parametrization domain, $G_1(u,v) = G_2(u,v)$, then $\phi$ is said to be an isometry. If there exists an isometry between two surfaces $M_1$ and $M_2$, they are said to be isometric.

A curve on one surface has the same length as that of its isometrically mapped version. An area of a patch on one surface is mapped by $\phi$ to a patch that has the same area. In fact, any geometric property that can be measured in terms of the metric G and its derivatives and integration with respect to u and v are preserved by the isometry $\phi$. We call such properties isometric invariant or intrinsic.

For each function $f: S \to \mathbb{R}$ defined on the surface there exists a corresponding function in the parameter domain $\tilde{f}: \Omega \subset \mathbb{R}^2 \to \mathbb{R}$, such that $$\tilde{f}(u,v) = f \circ S(u,v). \quad (4)$$

Similarly, we define a tangent vector field on the surface, $\vec{F}: M \to T_pM$, as an assignment of a tangent vector to each point on the surface. Since these fields are in the tangent plane, one can represent them in terms of the basis $\{S_u, S_v\}$. For each tangent vector field $\vec{F}$ on the surface, there exists a corresponding vector field with identical coordinates in the parametrization domain $\vec{F}$ represented by the natural basis of $\mathbb{R}^2$.

As defined in M. P. Do Carmo, "Dierential geometry of curves and surfaces", Vol. 2, Prentice-hall Englewood Cliffs, 1976, the gradient of a function on the surface, which we term here as gradient with respect to the metric G, is a differential operator that satisfies $$\langle \nabla_G f(p), \vec{w} \rangle_G = d_p f = \lim_{h \to 0} \frac{f(p + h\vec{w}) - f(p)}{h}, \quad (5)$$

for each $\vec{w} \in T_pM$. It follows that $$f(p + h\vec{w}) = f(p) + h \langle \nabla_G f(p), \vec{w} \rangle_G + O(h^2). \quad (6)$$

For the corresponding function in the parametrization domain $\tilde{f}(u,v)$, $$f(u_0 + hw_1, v_0 + hw_2) = f(u_0, v_0) + h \langle \nabla_{u,v} \tilde{f}(u_0, v_0), \vec{w} \rangle + O(h^2), \quad (7)$$

where $p = S(u_0, v_0)$, and $\vec{w} = (w_1, w_2)$. Since the left hand sides of (6) and (7) are equal, it follows that $$\langle \nabla_G f(p), \vec{w} \rangle_G = \langle \nabla_{u,v} \tilde{f}(u_0, v_0), \vec{w} \rangle. \quad (8)$$

And, therefore, $$\vec{w}^T G \nabla_G f(p) = \vec{w}^T \nabla_{u,v} \tilde{f}(u_0, v_0), \quad (9)$$

for each $\vec{w} \in T_pM$. This provides a formula for the gradient in terms of the gradient of its corresponding function in the parametrization domain $\tilde{f}$ and the parametrization S as $$\nabla_G f(p) = G^{-1} \nabla_{u,v} \tilde{f}(u_0, v_0). \quad (10)$$

Treating the space of functions and the space of fields on the surface as an Hilbert space, one can define inner product between two functions, $f$ and $g$, as $$\langle f, g \rangle_{L^2} = \int_\Omega f(x) g(x) da \quad (11)$$

and the inner product between to vector fields, $\vec{F}$ and $\vec{H}$, as $$\langle \vec{F}, \vec{H} \rangle_{F^2} = \int_\Omega \vec{F}(x)^T G \vec{H}(x) da. \quad (12)$$

Here, $da = \sqrt{\det G}\, du\, dv$.

The divergence is a differential operator that produces a function from a tangent field. It is defined as minus the adjoint operator of the gradient, with respect to the above inner products. That is, the divergence of fields on a manifold, denoted as $\nabla_G \cdot$, satisfies $$\langle \nabla_G \cdot \vec{F}, g \rangle_{L^2} = -\langle \vec{F}, \nabla_G g \rangle_{F^2}, \quad (13)$$

for any function g and a field $\vec{F}$ on the surface. By integration by parts and assuming that g vanishes on the boundaries, one can show that the divergence with respect to the metric of a tangent field can be calculated by $$\nabla_G \cdot \vec{F} = \frac{1}{\sqrt{\det G}} \nabla_{u,v} \cdot \left( \sqrt{\det G}\, \vec{\tilde{F}} \right), \quad (14)$$

where $\vec{\tilde{F}}$ is the corresponding field of $\vec{F}$ in the parameterization domain.

The laplacian is a differential operator that maps functions to functions. The laplacian of functions on the surface is called the Laplace-Beltrami operator and is denoted here as $\Delta_G$. It is defined as the divergence of the gradient. Thereby, it can be written as $$\Delta_G \cdot f = \frac{1}{\sqrt{\det G}} \nabla_{u,v} \cdot \left( \sqrt{\det G}\, G^{-1} \nabla_{u,v} \tilde{f} \right) \quad (15)$$

1.2 Gradient-Based Deformation

The gradient fields of these functions with respect to a given metric, $\nabla_G x$, $\nabla_G y$ and $\nabla_G z$, define three vector fields that reside in the tangent plane $T_pM$, defined by $S_u$ and $S_v$, about each point s on the surface $p \in M$. See FIG. 1, which shows the gradient fields of the coordinate functions at each point on the surface residing on the tangent plane.

The gradient-based deformation method, proposed in Y. Yu, K. Zhou, D. Xu, X. Shi, H. Bao, B. Guo, H.-Y. Shum, "Mesh editing with poisson-based gradient field manipulation", ACM SIGGRAPH 2004 vol. 23 (3), 644-651, first transforms each field locally and arbitrarily, $\nabla_G x(p) \to T_p(\nabla_G x(p))$. In order to derive the deformed surface, $\tilde{S} = \{\tilde{x}, \tilde{y}, \tilde{x}\}$, whose coordinate-functions gradient fields mostly agree with the manipulated ones in a least-squares sense, the method minimizes the following term for each coordinate function separately $$\int_S \|\nabla_G \tilde{x}(p) - T_p(\nabla_G x(p))\|^2 da(p), \tag{16}$$

with similar functionals for y and z. Here, da(p) is an area element about the point p∈S. The Euler-Lagrange equation of the above functional is the Poisson equation $$\Delta_G \tilde{x} = \nabla_G \cdot (T_p(\nabla_G x)), \tag{}$$

or in surface notation, $$\Delta_G \tilde{S} = \nabla_G \cdot (T_p(\nabla_G S)). \tag{17}$$

This simple method gave birth to a rich family of surface deformation techniques. For example, restricting the deformations to isometries, the set of local transformations $\{T_p\}$ is limited to rotation matrices. In the present exaggeration method, we restrict ourselves to simple scalar scaling.

Other linear mesh deformation techniques include thin-shell (M. Botsch, L. Kobbelt, "An intuitive framework for real-time freeform modeling", ACM Transactions on Graphics (TOG) 23 (3), 2004, 630-634) and Laplacian-based (O. Sorkine, D. Cohen-Or, Y. Lipman, M. Alexa, C. Rossi, H.-P. Seidel, "Laplacian surface editing", 2004, 175-184), to name just a few. M. Botsch, O. Sorkine, "On linear variational surface deformation methods", Visualization and Computer Graphics, IEEE Transactions on, 14 (1), 2008, 213-230, reviews some of these techniques and compares them. For a broader overview of these and other related deformation methods, see M. Botsch, L. Kobbelt, M. Pauly, P. Alliez, B. Levy., "Polygon mesh processing", A K Peters/CRC Press, 2010.

Next, we define a model-based framework for relative exaggeration. Let S be the surface of a given object. In addition, assume we are given a bijective map $\phi: S \to \hat{S}$, between S and the surface, $\hat{S}$, of a given representative average object. Such maps can be obtained by surface registration algorithms like non-rigid ICP with a sparse correspondence (see T. Weise, H. Li, L. Van Gool, M. Pauly, "Face/off: Live facial puppetry", in Proceedings of the 2009 ACM SIGGRAPH/Eurographics Symposium on Computer animation, ACM, 2009, 7-16).

In accordance with present embodiments, there may be two requirements from a caricaturization process: First, it needs to exaggerate the discrepancies from a given model. Second, it needs to be invariant to pose or independent of the embedding. To satisfy the latter, we scale the given surface gradient fields by some function of the absolute Gaussian curvature |K| of the surface S. The choice of the Gaussian curvature, the simplest isometry invariant differential quantity, as an amplification factor makes the present method robust to isometries of the surface.

In order to exaggerate the discrepancies from the average model, we choose the following function as a local scaling factor $$f(p) = |K(p)|^{\beta \log \frac{da(p)}{d\hat{a}(\phi(p))}}, \tag{18}$$

where β is some positive constant, da(p) is an area element about p∈S and $d\hat{a}(\phi(p))$ is the corresponding area element about $\phi(p) \in \hat{S}$—the average representative surface. Note that given $\phi$, the corresponding area elements can be easily computed by defining a corresponding parametrization.

In warped surface elements where there is no local scaling, that is $da(p) = da(\phi(p))$, no exaggeration is executed. Regions that were shrunk with respect to the reference model will shrink even more, while those that were stretched will stretch more in the present method. In the case where no prior average model exists, we could assume, for example, that $$\log \frac{da(p)}{d\hat{a}(\phi(p))} = \varepsilon$$

and thereby scale the gradient fields by $|K|^\gamma$, where $\gamma = \epsilon \beta$ is some non-negative constant.

Figure 2:
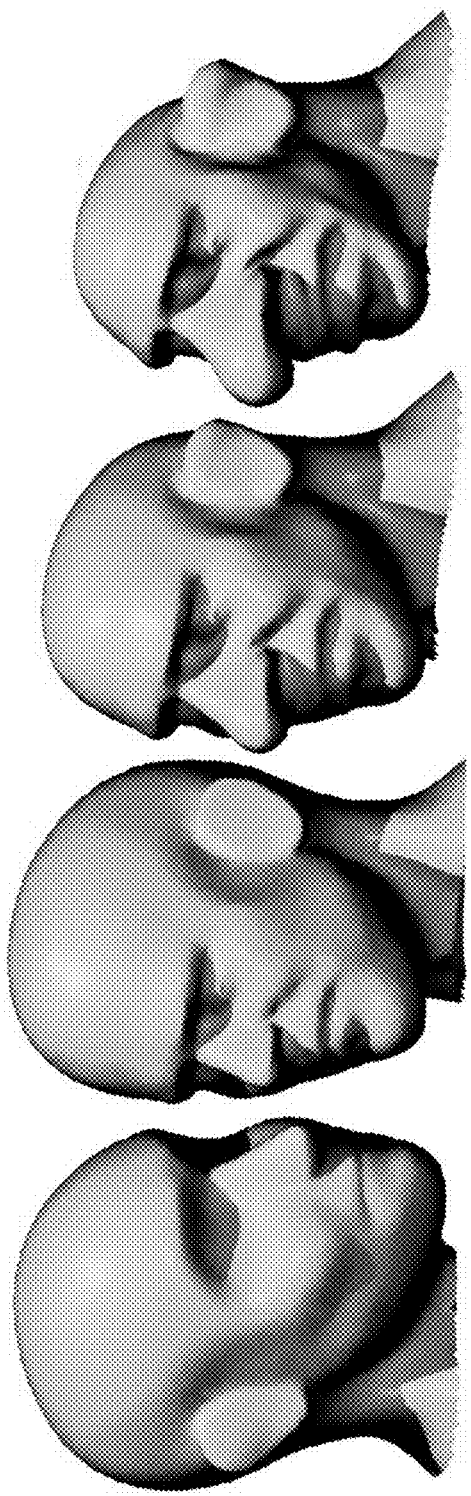
FIG. 2 shows the results of exemplary caricaturization of a facial 3D model, based on a reference (also "average") model.

FIG. 2 shows, from left to right: a reference (also "average") 3D model of a face; a 3D model of an actual face, which naturally differs from the reference; a caricature of the actual face, with an exaggeration factor β=0.3; and a caricature of the actual face, with an exaggeration factor β=0.5.

In order to find a regular surface whose gradients with respect to the parametrization best fits the scaled ones, we minimize the squared difference between the tangent fields and end up with the following Poisson equation $$\Delta_G \tilde{S} = \nabla_G \cdot (f(p)\nabla_G S) = \nabla_G \cdot \left(|K(p)|^{\beta \log \frac{da(p)}{d\hat{a}(\phi(p))}} \nabla S\right). \tag{19}$$

Here, $\tilde{S}$ is the exaggerated surface we are looking for, and the differential operators are taken with respect to the metric of the given surface S. When there is no reference surface $\hat{S}$, the enhancement simplifies to the solution of the following Poisson equation $$\Delta_G \tilde{S} = \nabla_G \cdot (|K|^\gamma \nabla_G S). \tag{20}$$

2. Isometry Preservation

We define two isometric surfaces as parametrized surfaces between which an isometric map exists. By construction, the present surface enhancement model is robust to isometric transformations. That is, given two isometric surfaces $S_1, S_2$, if we can find corresponding surfaces $\tilde{S}_1$ and $\tilde{S}_2$ that satisfy Equation (20), we also have that $\tilde{S}_1 \approx \tilde{S}_2$.

Thorem 2.1. If the surfaces $S_1$ and $S_2$ are isometric, and there exist two surfaces $\tilde{S}_1$ and $\tilde{S}_2$ such that $$\nabla_{G_1} \tilde{S}_1 = |K_1| \nabla_{G_1} S_1, \tag{21}$$

and $$\nabla_{G_2} \tilde{S}_2 = |K_2| \nabla_{G_2} S_2, \tag{22}$$

then, $\tilde{S}_1$ and $\tilde{S}_2$ are isometric.

Proof. By definition, the metric of $\tilde{S}_1$ can be written in terms of the Jacobian of the parametrization as $$\tilde{G}_1 = \tilde{J}_1^T \tilde{J}_1, \tag{23}$$

where $\tilde{J}_1$ is a matrix whose columns are $\tilde{S}_{1u}$ and $\tilde{S}_{1v}$.

By writing the gradient of the coordinate functions of $\tilde{S}_1$ as functions on the surface $S_1$ explicitly, we get $$\nabla_{G_1}\tilde{S}_1 = G_1^{-1}\nabla\tilde{S}_1 = G_1^{-1}\tilde{J}_1. \quad (24)$$

Therefore, $$\tilde{G}_1 = \nabla_{G_1}\tilde{S}_1{}^T G_1 \nabla_{G_1}\tilde{S}_1. \quad (25)$$

By plugging relation (21) into the above equation, we get $$\tilde{G}_1 = |K_1|^2 \nabla_{G_1}S_1{}^T G_1 \nabla_{G_1}S_1 = |K_1|^2 \nabla S_1{}^T \nabla S_1 = |K_1|^2 G_1. \quad (26)$$

By repeating the same derivation for $\tilde{S}_2$, we similarly obtain $$\tilde{G}_2 = |K_2|^2 G_2. \quad (27)$$

Since we assumed that the surfaces $S_1$ and $S_2$ are isometric, the metric and the Gaussian curvature are equal for corresponding points on the these surfaces. Hence, $$|K_1|^2 G_1 = |K_2|^2 G_2. \quad (28)$$

We can conclude that $$\tilde{G}_1 = \tilde{G}_2 \quad (29)$$

which proves that indeed the surfaces $\tilde{S}_1$ and $\tilde{S}_2$ are isometric.

Since we minimize the difference between the fields on isometric surfaces, and the divergence is intrinsic, the exaggeration is robust to isometries in a least squares sense. In practice, surfaces which are isometric to one another are rigidly equivalent in the discrete case. However, experimentally, for almost isometric shapes, the isometric deviation of the resulting caricatures, i.e. the Gromov-Hausdorff distance, is negligible.

3. Implementation Considerations

One possible implementation of the present framework is when approximate continuous surfaces by triangulated meshes. In what follows, we briefly review discrete approximations of a continuous function defined on the surface, its gradient, the surface Gaussian curvature, a discrete divergence operator (Y. Tong, S. Lombeyda, A. N. Hirani, M. Desbrun, "Discrete multiscale vector field decomposition", Proceedings of ACM SIGGRAPH 2003, vol. 22 (3), 445-452), and a discrete Laplace-Beltrami operator (M. Meyer, M. Desbrun, P. Schroder, A. H. Barr, "Discrete diferential geometry operators for triangulated 2-manifolds", in Visualization and mathematics III, Springer, 2003, 35-57). We conclude by combining these elements together for solving the system of equations (20) with some additional constraints that would fix, for example, some surface points as boundary conditions.

Figure 3A:
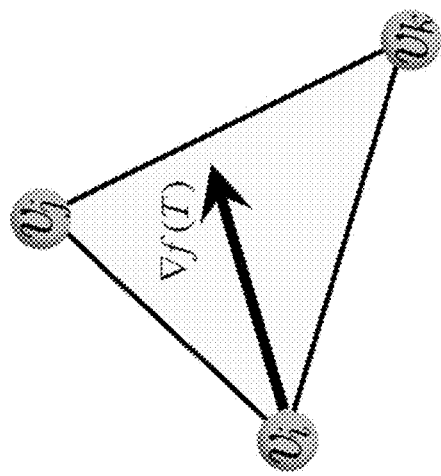
FIGS. 3A-D visualize four of the equations of the Implementation Considerations section below.

For the discretization we use the finite element method (FEM), in which every function $f$ defined on the surface is assumed to be piecewise linear. As such, it can be represented with the piecewise linear basis functions $\{B_i\}_{i=1}^n$ as $$f(x) = \sum_{i=1}^n f_i B_i(x),$$

where n is the number of vertices, $f_i$ is the value of the function $f$ at the vertex $v_i$, and $B_i(x)$ is a linear B-spline function that is equal to 1 at the vertex $v_i$ and 0 at the rest of the vertices. Within each triangle $T=(v_i,v_j,v_k)$, $f$ is linearly interpolated only by $f_i$, $f_j$, and $f_k$. It can be shown that the gradient of $f$ within each triangle is constant (Meyer et al. 2003), and given by $$\nabla f(T) = (f_j - f_i)\frac{(s_i - s_k)^\perp}{2A_T} + (f_k - f_i)\frac{(s_j - s_i)^\perp}{2A_T},$$

illustrated in FIG. 3A, where $s_i$, $s_j$, and $s_k$ are the coordinates of the vertices $v_i$, $v_j$, and $v_k$, respectively, $\perp$ denotes the counterclockwise 90° rotation operator in the triangle plane, and $A_T$ is the area of the triangle T.

Figure 3B:
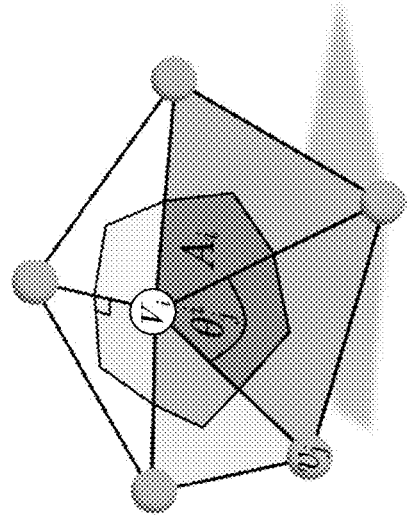

There are different computational schemes for locally estimating the Gaussian curvature of a triangulated mesh. See T. Surazhsky, E. Magid, O. Soldea, G. Elber, E. Rivlin, "A comparison of gaussian and mean curvatures estimation methods on triangular meshes", Robotics and Automation, 2003. Proceedings. ICRA '03. IEEE International Conference on, (1), 2003, 1021-1026, for a review and evaluation. Introduced in Meyer et al. 2003 is the so called Gauss-Bonnet scheme, given by $$K(v_i) = \frac{1}{A_i}\left(2\pi - \sum_{j:v_j \in 1(v_i)} \theta_j^i\right),$$

illustrated in FIG. 3B, where $A_i$ is the Voronoi area about the vertex $v_i$, and $\theta_j^i$'s are the incident angles to the vertex $v_i$. Another scheme, presented in D. Cohen-Steiner, J.-M. Morvan, "Restricted delaunay triangulations and normal cycle", SCG '03 Proceedings of the nineteenth annual symposium on Computational geometry, 312-321, approximates the second fundamental form at each vertex $v_i$. The eigenvalues of the second fundamental form are the principal curvatures, $k_1$ and $k_2$, by which we derive the Gaussian curvature to be $K(v_i)=k_1(v_i)\cdot k_2(v_i)$. An implementation of this scheme in Matlab is given in Gabriel Peyre's Toolbox Graph. We tested both schemes in our experiments.

Figure 3C:
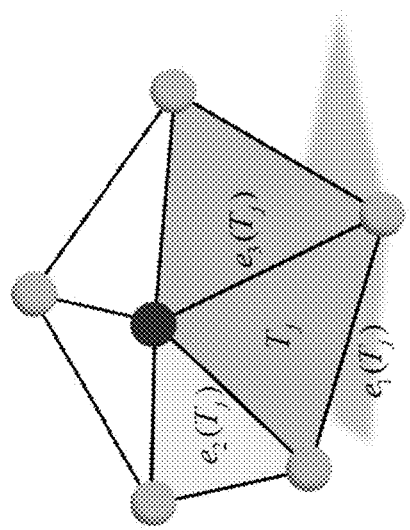

A discrete formulation of the divergence operator can be derived from the divergence theorem $$\iint_A \nabla \cdot \vec{F}\, da = \oint_{\partial A} \vec{F} \cdot \hat{n}\, dl,$$

where $\vec{F}$ is a given vector field, and $\hat{n}$ is an outward pointing unit vector normal to the boundary. We assume that $\vec{F}$ is constant within each triangle of the mesh, and approximate its divergence at a vertex $v_i$ by averaging the divergence over a 1-ring neighborhood, $$Div(\vec{F})(v_i) \triangleq \frac{\iint_{1(v_i)} \nabla \cdot \vec{F}\, da}{\iint_{1(v_i)} da}$$

$$= \frac{\sum_{T_j \in 1(v_i)} \iint_{A(T_j)} \nabla \cdot \vec{F}\, da}{\sum_{T_j \in 1(v_i)} A(T_j)}$$

$$= \frac{\sum_{T_j \in 1(v_i)} \oint_{\partial A(T_j)} \vec{F} \cdot \hat{n}\, dl}{\sum_{T_j \in 1(v_i)} A(T_j)}$$

$$= \frac{\sum_{T_j \in 1(v_i)} \sum_{e_k \in T_j} F(T_j) \cdot e_k(T_j)^\perp}{\sum_{T_j \in 1(v_i)} A(T_j)},$$

illustrated in FIG. 3C, where $1(v_i)$ is the 1-ring neighborhood, comprised of the triangles incident to $v_i$, $A(T_j)$ is the area of the triangle $T_j$, and $e_k(T)^\perp$ is an outwardly directed vector normal to the $k^{th}$ edge of the triangle $T_j$ with similar length to the edge $e_k(T_j)$.

Figure 3D:
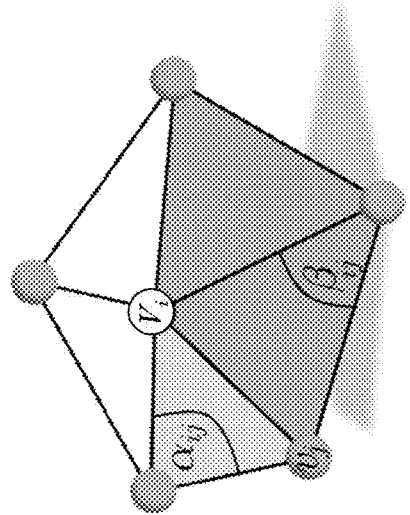

For discretizing the Laplace-Beltrami operator, we use the cotangent weight scheme for triangulated meshes (Meyer et al. 2003). We plug the values of a given function at each vertex, $f_i=f(v_i)$, to a vector, and multiply it by $L=A^{-1}W$, where A is the diagonal matrix of the Voronoi cell areas about each vertex, as introduced in U. Pinkall, K. Polthier, "Computing discrete minimal surfaces and their conjugates", Experimental Mathematics 2 (1), 1993, 1536. W is the classic cotangent weight matrix $$W_{ij} = \begin{cases} \sum_{j:v_j \in \mathcal{N}_1(v_i)} (\cot\alpha_{ij} + \cot\beta_{ij}) & \text{if } i=j \\ -\cot\alpha_{ij} - \cot\beta_{ij} & \text{if } i \neq j, v_j \in \mathcal{N}_1(v_i) \\ 0 & \text{otherwise} \end{cases}$$

illustrated in FIG. 3D, where $\alpha_{ij}$ and $\beta_{ij}$ are the angles opposite to the edge $(v_i,v_j)$.

Boundary Conditions: There are various ways to deal with boundaries in the present framework. Here, we describe three possible alternatives. Other options could also be applied depending on the application. Next, we describe how to incorporate either soft or hard constraints along the boundary of the shape.

For hard constraints, we formulate the linear system as the constrained least-squares optimization problem $$\min_{\tilde{x}} \|L\tilde{x} - b\|_A^2 \quad (30)$$
$$\text{s.t. } \tilde{x}_j = x^*, v_j \in \partial S,$$

where $b=\text{Div}(|K|^\gamma\text{Grad}(x))$. Note that the norm is weighted by the area of the Voronoi cells about any vertex. Therefore, the norm can be written as $\|F\|_A^2=(F^TAF)$. The linear equality constraints can be written as $B\tilde{x}=x^*$, where B is a sampling matrix, in which each row is zero, besides those that correspond to the constrained vertices. $x^*$ is a vector of the final positions of the constrained vertices. Using the Lagrange multipliers approach, the solution to the above problem is $$\begin{pmatrix} L & B \\ B^T & 0 \end{pmatrix} \begin{pmatrix} \tilde{x} \\ \lambda_x \end{pmatrix} = \begin{pmatrix} \text{Div}(|K|^\gamma\text{Grad}(x)) \\ x^* \end{pmatrix}. \quad (31)$$

Similar systems are solved for $\tilde{y}$ and $\tilde{z}$.

For soft constraints, one can add a controllable quadratic term for manipulating the boundary vertices and minimize the following unconstrained optimization problem $$\min_{\tilde{x}} \|L\tilde{x} - b\|_A^2 + \mu\|B\tilde{x} - x^*\|_A^2. \quad (32)$$

The solution to Problem (32) is $$\tilde{x}=(LAL+\mu B^TAB)^{-1}(ALb+\mu AB^Tx^*). \quad (33)$$

The third type of boundary constraints are set by fixing $\gamma=0$ on selected triangles. This technique enables keeping some regions fixed throughout the exaggeration.

3. Experimental Results

We evaluate the present caricature generation method by conducting and discussing several example use cases. First, we demonstrate its applicability by caricaturizing a number of synthetic surfaces and captured geometries. Then, we discuss the performance analysis of a real-time implementation of the present algorithm. Next, we examine the robustness of the method to almost isometric deformations. We conclude the section by proposing two possible applications.

3.1 Qualitative Evaluation

We demonstrated the power of the self-caricaturization method by applying it to triangulated meshes. The shade of the meshes in FIGS. 4 and 5 represents the approximated Gaussian curvature at each point.

Figure 4:
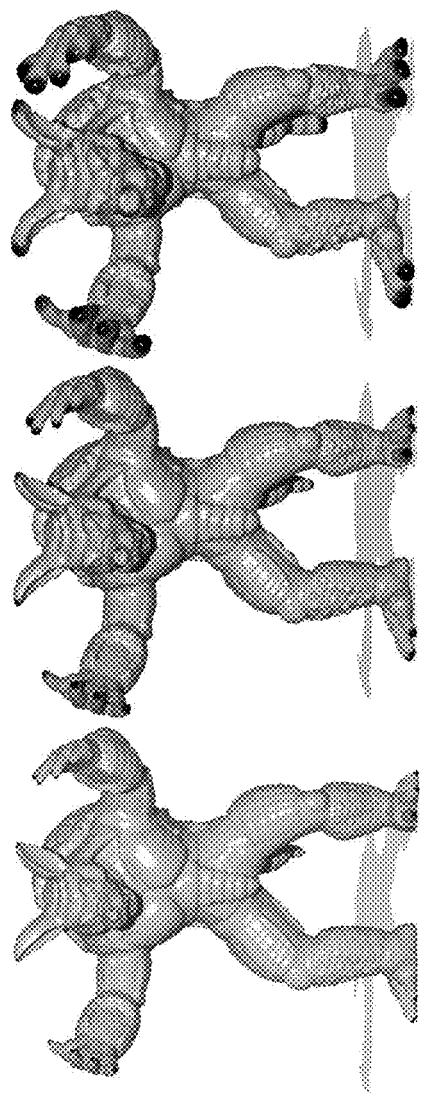
FIG. 4 shows the results of exemplary caricaturization of an armadillo 3D model, with a visualization of the approximated Gaussian curvature of the original mesh.

FIG. 4 shows, from left to right: an original 3D model of a armadillo; a caricature with an exaggeration factor $\gamma=0.5$; and a caricature with an exaggeration factor $\gamma=1$. The approximated Gaussian curvature of the original mesh is indicated by the darkness of the armadillo, where larger values are highlighted using a darker shade, visible especially at the armadillo's fingertips, toe tips, ear tips, tail tip, nose tip, etc., and smaller values are shown as lighter shades.

Figure 5:
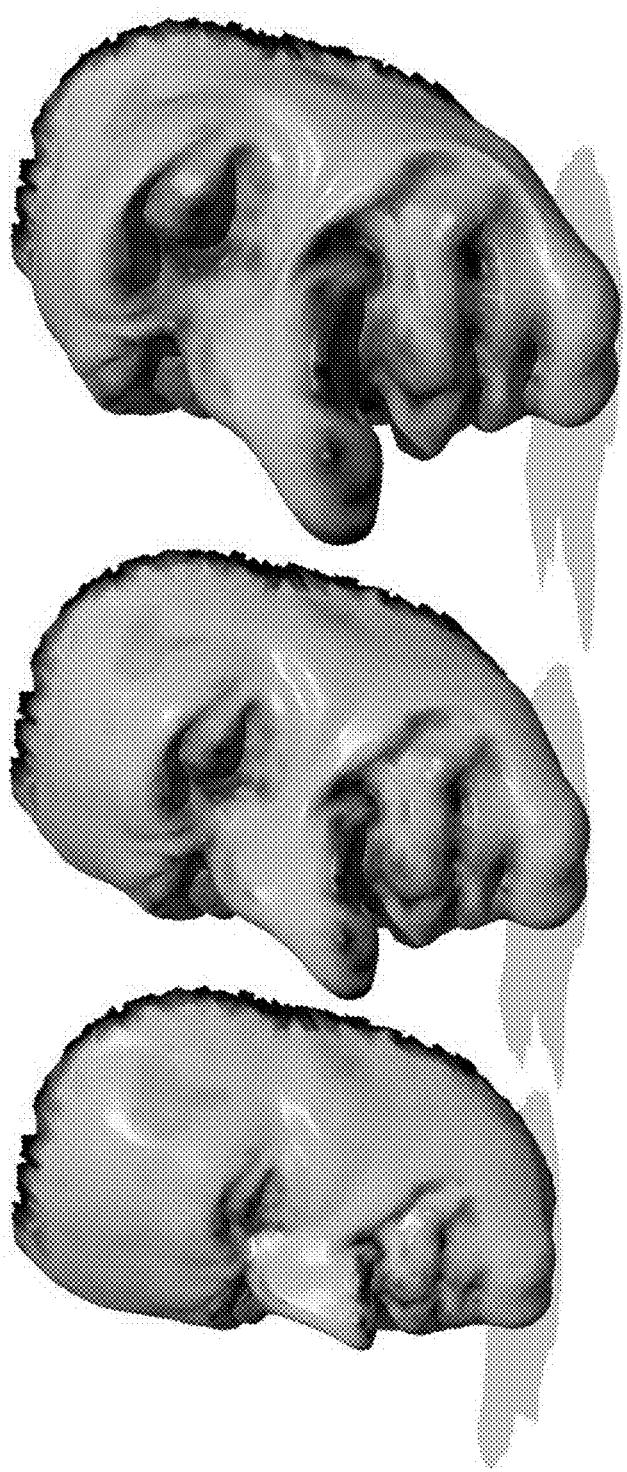
FIG. 5 shows the results of exemplary caricaturization of a facial 3D model, with a visualization of the approximated Gaussian curvature of the original mesh.

FIG. 5 shows, from left to right: an original facial 3D model; a caricature with an exaggeration factor $\gamma=0.5$; and a caricature with an exaggeration factor $\gamma=0.75$. The approximated Gaussian curvature of the original mesh indicated by the darkness of the face, where larger values are highlighted using a darker shade, visible especially at the bottom part of the nose, the lips and the eyes, and smaller values are shown as lighter shades. Note that the darker shade of the face's boundaries does not imply that they have any substantial Gaussian curvature. In fact, areas around the boundaries have undefined curvature, calling for use of certain constraints in the computation, without which the boundaries would have corrupted the caricature.

FIGS. 4 and 5, namely, demonstrate how regions with high Gaussian curvature scale up, whereas regions with small Gaussian curvature shrink. Regions with approximately constant Gaussian Curvature were scaled uniformly. These caricatures were created using the geometric driven approach. That is, without a reference model.

Figure 6:
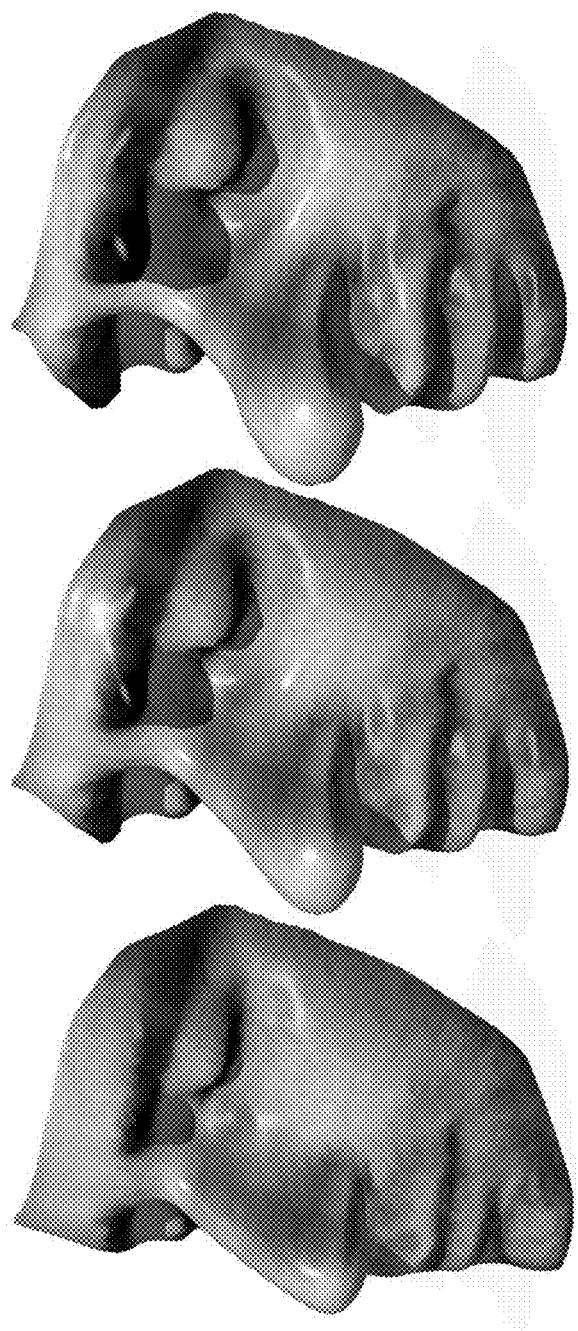
FIG. 6 shows the results of exemplary caricaturization of a textured face 3D model.
Figure 7:
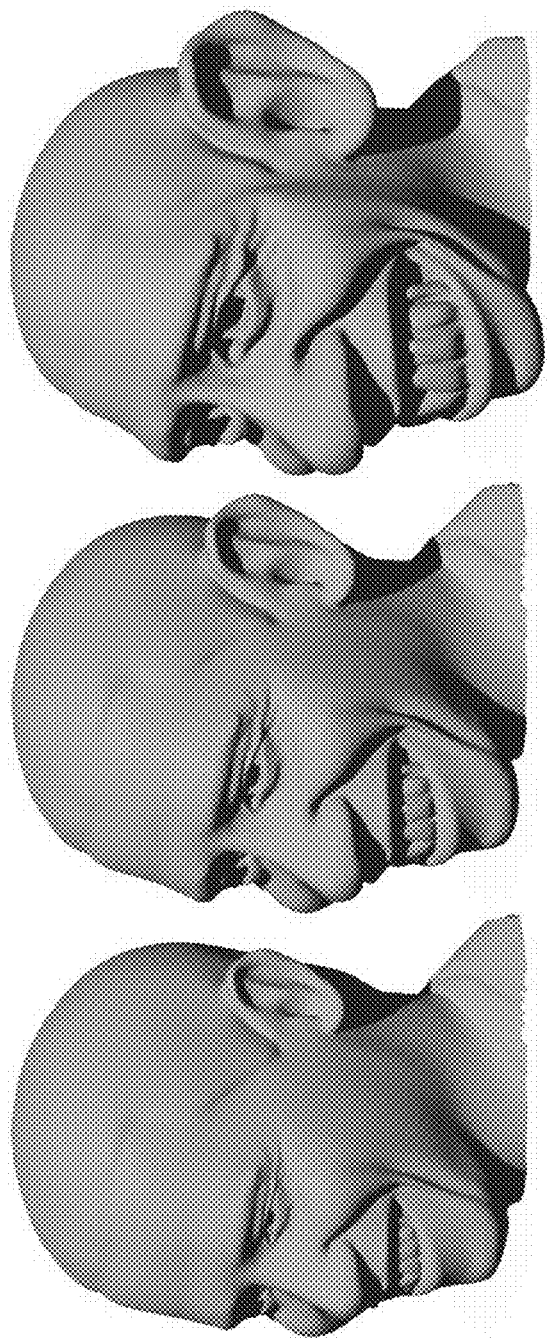
FIG. 7 shows the results of exemplary caricaturization of another facial 3D model.

We tested our method on faces and shapes with boundaries, see FIGS. 5, 6, and 7. The resulting caricatures demonstrate an exaggeration of unique features and expressions of the subject's face in a natural comical fashion. The nose was stretched while flat regions like the cheeks, shrank, suggesting the applicability of our method to face recognition.

In FIG. 6, from left to right: an original facial 3D model having a texture; a caricature with an exaggeration factor $\gamma=0.5$; and a caricature with an exaggeration factor $\gamma=0.75$.

In FIG. 7, from left to right: another original facial 3D model; a caricature with an exaggeration factor $\gamma=0.5$; and a caricature with an exaggeration factor $\gamma=0.75$.

As with most mesh deformation techniques, the present method may introduce self-intersections, particularly for large exaggeration factors. However, since we solve a Poisson equation, this intersection occurs only globally. Using post-processing self-collision handling methods, such as the one of D. Harmon, D. Panozzo, O. Sorkine, D. Zorin, "Interference-aware geometric modeling", in ACM Transactions on Graphics (TOG), Vol. 30, ACM, 2011, p. 137, one can remove these intersections.

3.2 Run-time Analysis

The algorithm was implemented both in Matlab and in C++. For the C++ version, we used the open source version of Eigen Library (G. Guennebaud, B. Jacob, et al., "Eigen v3", http://eigen.tuxfamily.org, 2010, last viewed Apr. 5, 2015). All the experiments were executed on a 2.6 GHz Intel Core i7 machine with 8 Gigabytes (GB) of Random-Access Memory (RAM). Run-times for various meshes from the TOSCA dataset (A. Bronstein, M. Bronstein, R. Kimmel, "Project TOSCA", 2010, http://tosca.cs.technion.ac.il, last viewed Apr. 5, 2015) are shown in Table 1. The pre-processing stage includes calculating the laplacian matrix, the Gaussian curvature, the gradient of the original shape, and matrices for calculating the discrete divergence efficiently. The core runtime includes taking the power of the curvature in each triangle, multiplying the gradients fields by $|K|^\gamma$, and solving the resulting sparse linear system.

TABLE 1

Pre-processing and core run-times (in milliseconds) of the present algorithm for exaggerating features of shapes from TOSCA dataset.

| Model name | No. of vertices | No. of faces | Pre-processing runtime | Core runtime |
|---|---|---|---|---|
| Wolf | 4344 | 8684 | 349.5 | 7.4 |
| Centaur | 15768 | 31532 | 1538.2 | 29.3 |
| Dog | 25290 | 50528 | 2944.7 | 47.0 |
| Human | 52565 | 105032 | 7245.6 | 105.8 |

3.3 Robustness to Almost Isometric Deformation Analysis

To evaluate the robustness of the present method to almost isometric deformations of shapes, we applied it to shapes in two different poses. We calculated the histograms of normalized distortion of geodesic distances between corresponding points on the two shapes, before and after exaggeration was applied (see FIGS. 8 and 9). The results demonstrate that caricaturizing two almost isometric shapes indeed produces two almost isometric caricatures.

Figure 8:
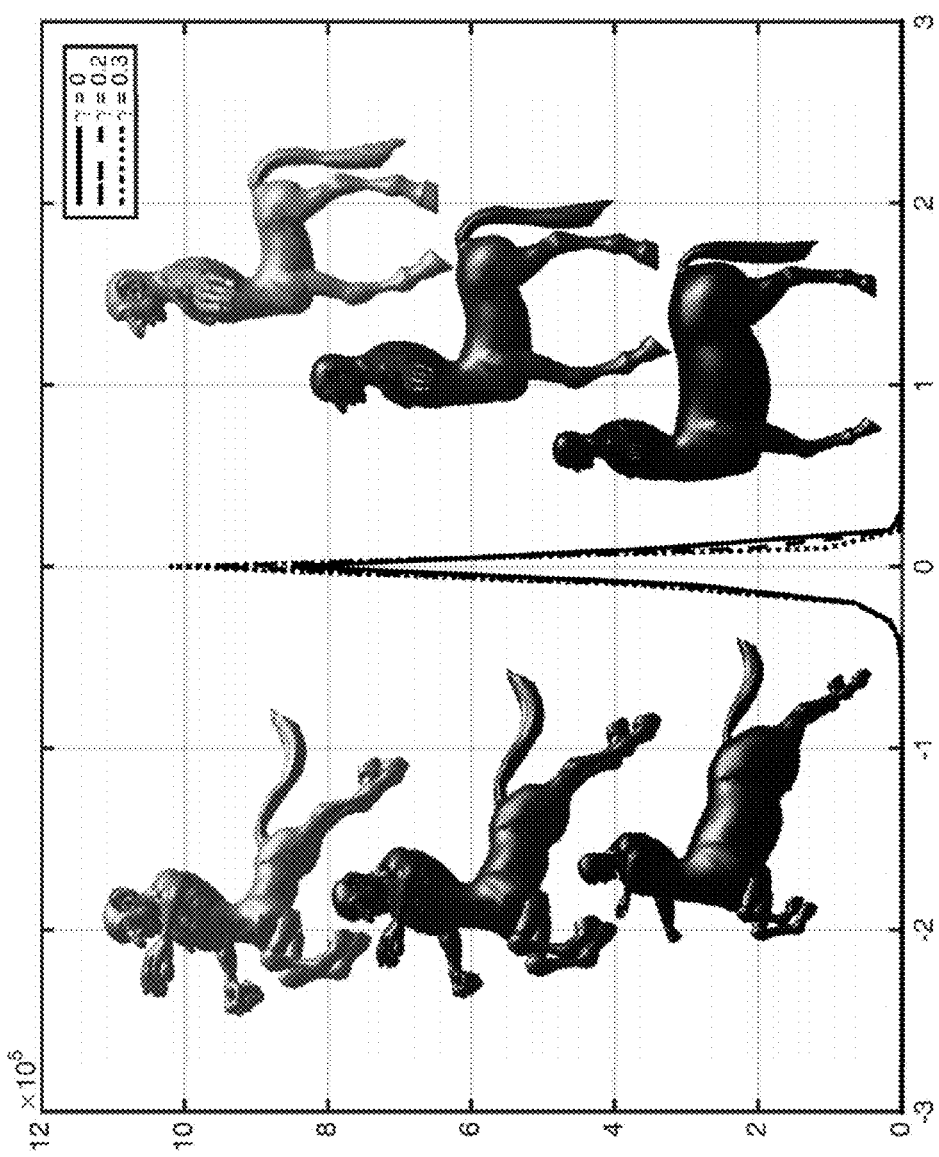
FIG. 8 shows a histogram of relative geodesic distortion (in %) between caricatures of a Centaur.

FIG. 8 shows a histogram of relative geodesic distortion (in %) between caricatures of a Centaur. The X axis denotes the amount of point pairs, and the Y axis denotes the percent change in geodesic distance between these two points. From bottom to top: Almost isometric centaurs; centaurs with exaggeration factor $\gamma=0.2$; and centaurs with exaggeration factor $\gamma=0.3$.

Figure 9:
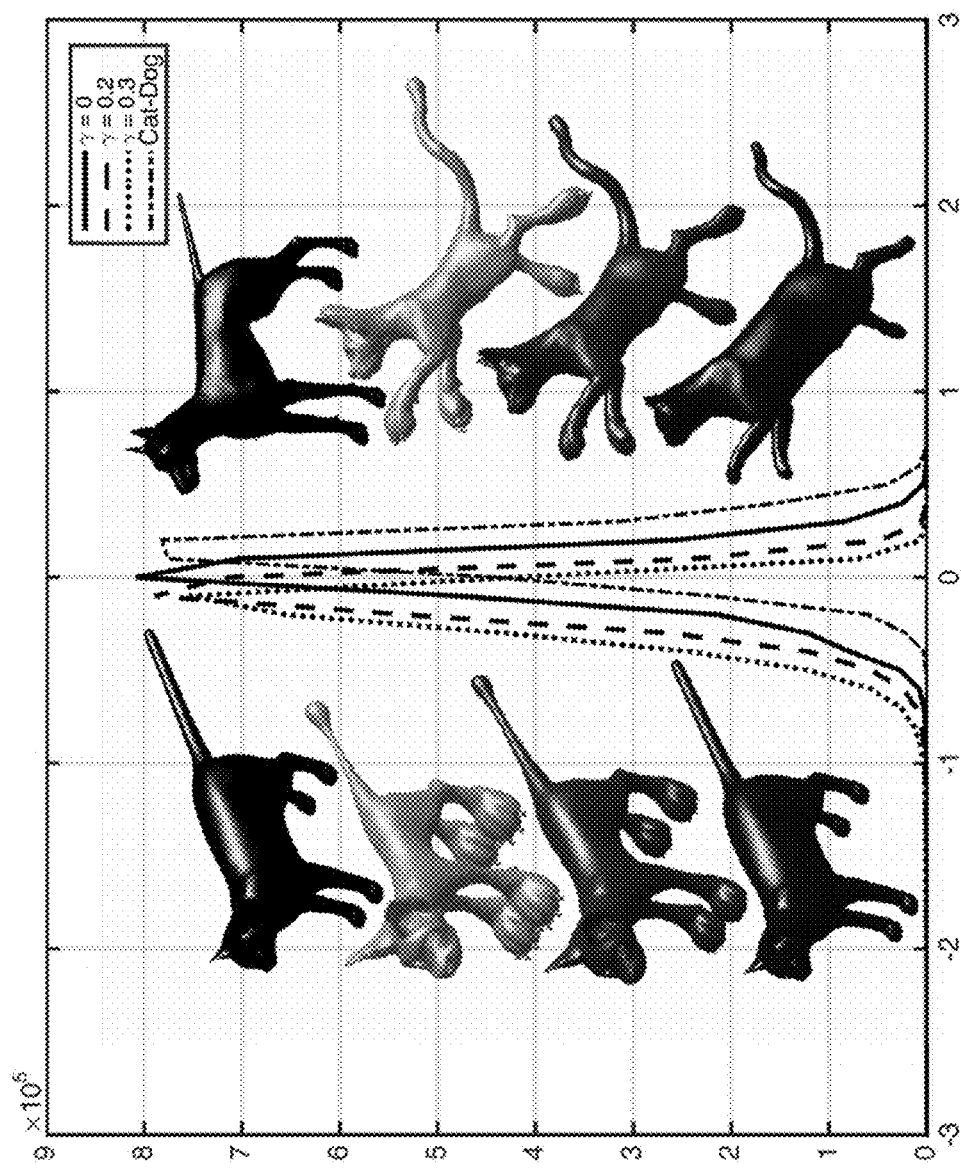
FIG. 9 shows a histogram of relative geodesic distortion (in %) between caricatures of a cat.

FIG. 9 shows a histogram of relative geodesic distortion (in %) between caricatures of a cat. The X axis denotes the amount of point pairs, and the Y axis denotes the percent change in geodesic distance between these two points. From bottom to top: Almost isometric cats; cats with exaggeration factor $\gamma=0.2$; cats with exaggeration factor $\gamma=0.3$; and a map which is as isometric as possible between a cat and a dog.

Figure 10:
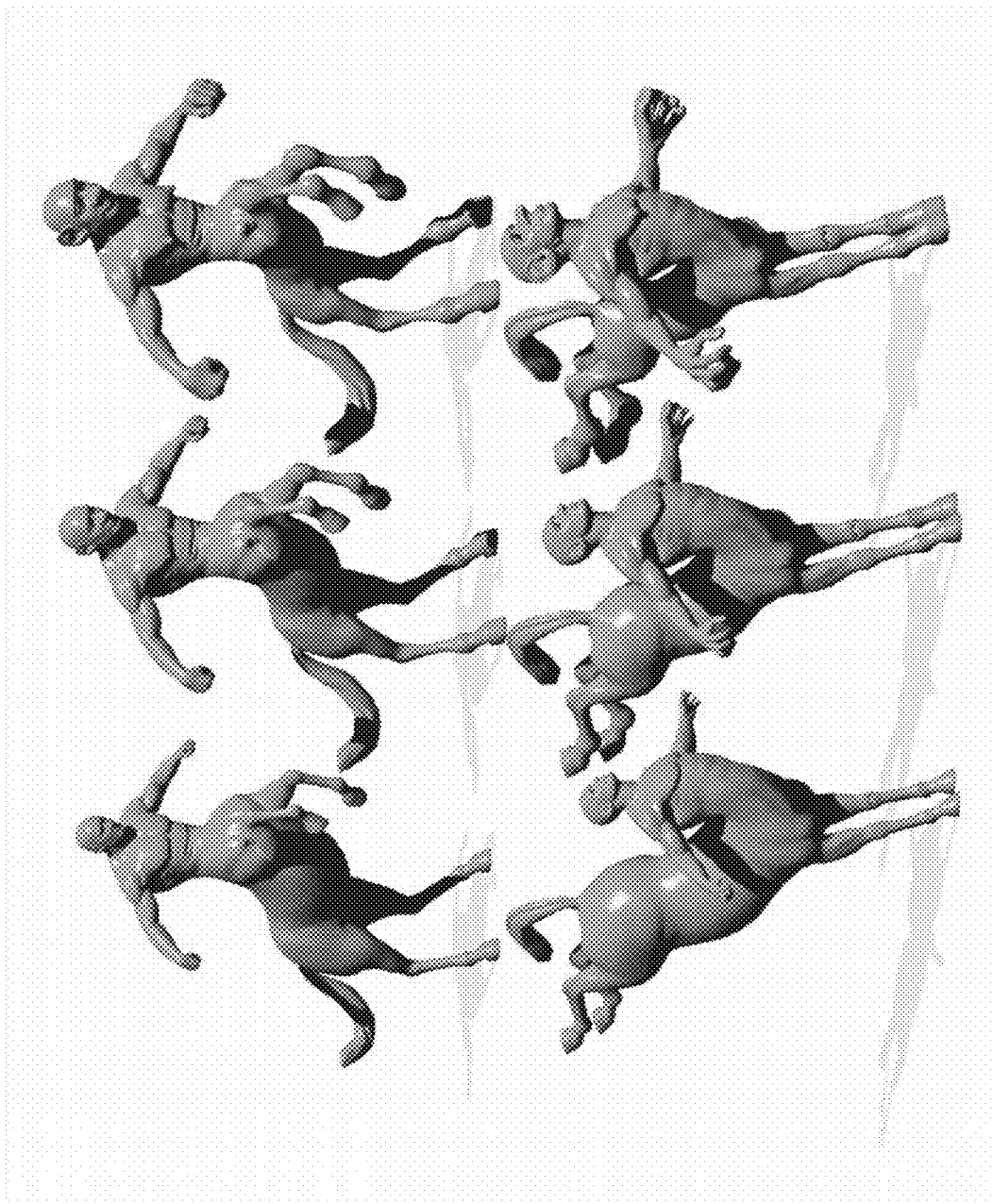
FIG. 10 shows the results of exemplary caricaturization of a centaur 3D model, in two different poses.

To demonstrate the isometry preservation property, we exaggerated a centaur shape in two different poses. In FIG. 10, top row, from left to right: an original 3D model of the centaur in a first pose; a caricature of the first pose with an exaggeration factor $\gamma=0.25$; and a caricature of the first pose with an exaggeration factor $\gamma=0.5$. Bottom row, left to right: an original 3D model of the centaur in a second pose; a caricature of the second pose with an exaggeration factor $\gamma=0.25$; and a caricature of the second pose with an exaggeration factor $\gamma=0.5$.

Figure 11:
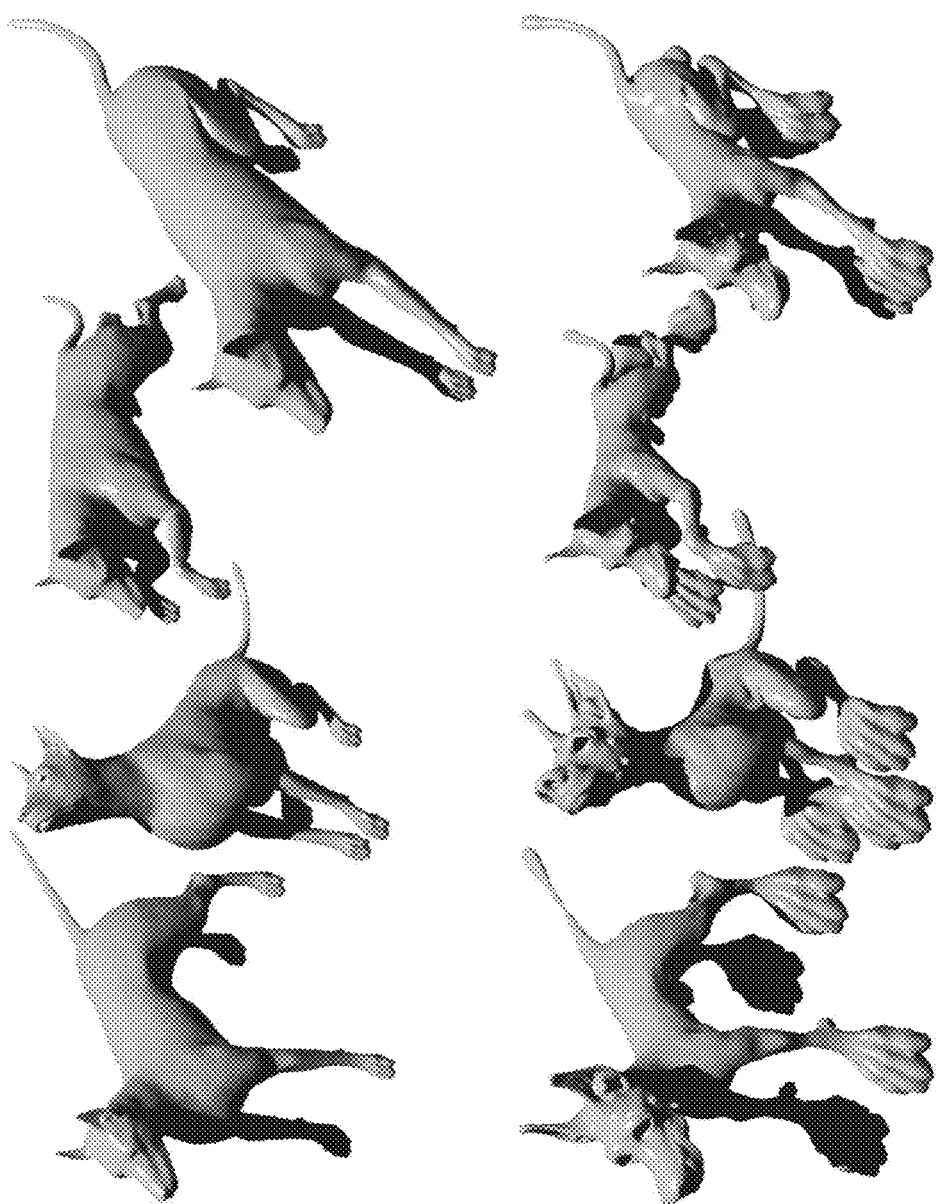
FIG. 11 shows the results of exemplary caricaturization of a dog 3D model, in four different poses.
Figure 12:
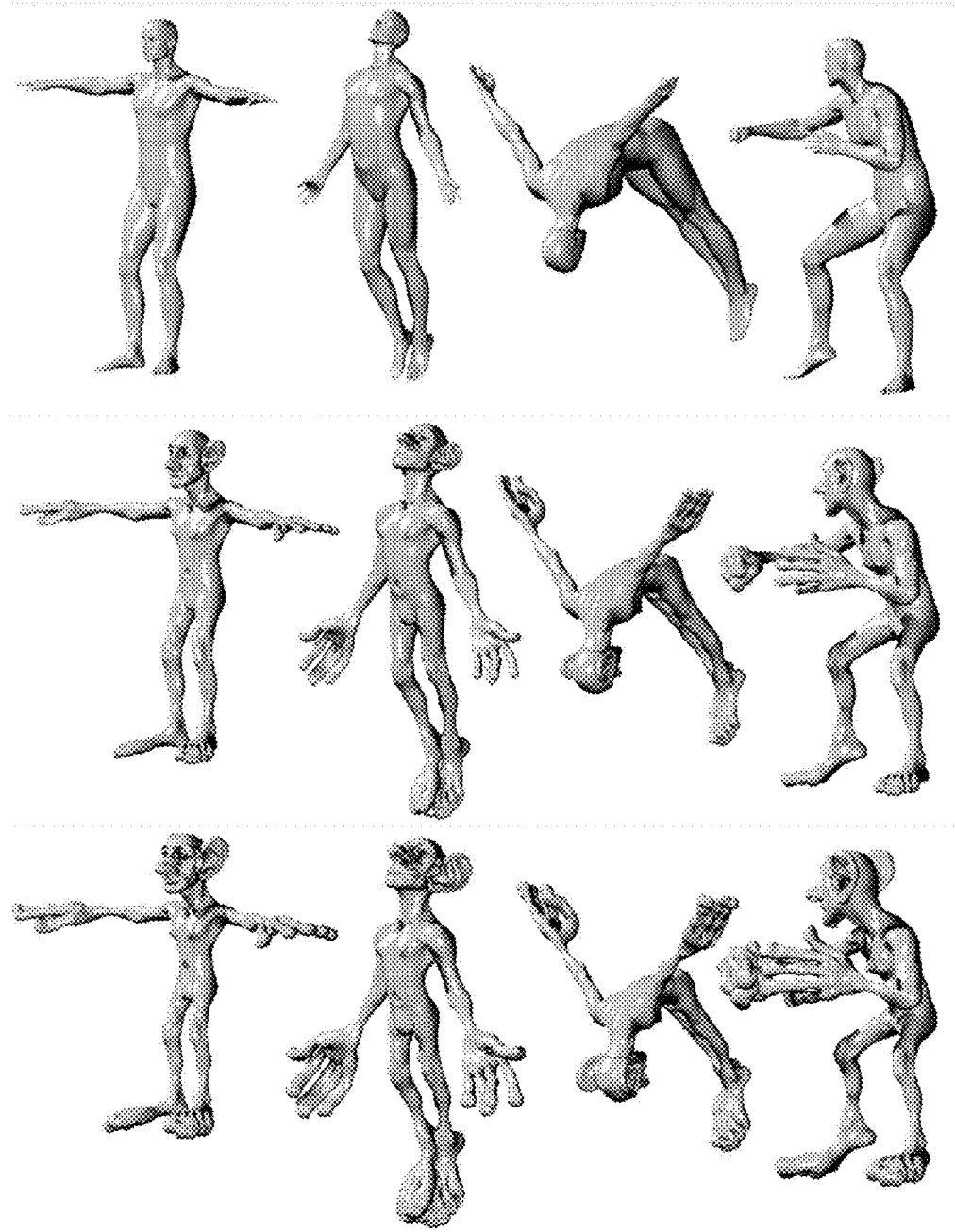
FIG. 12 shows the results of exemplary caricaturization of a gymnast 3D model, in four different poses.
Figure 13:
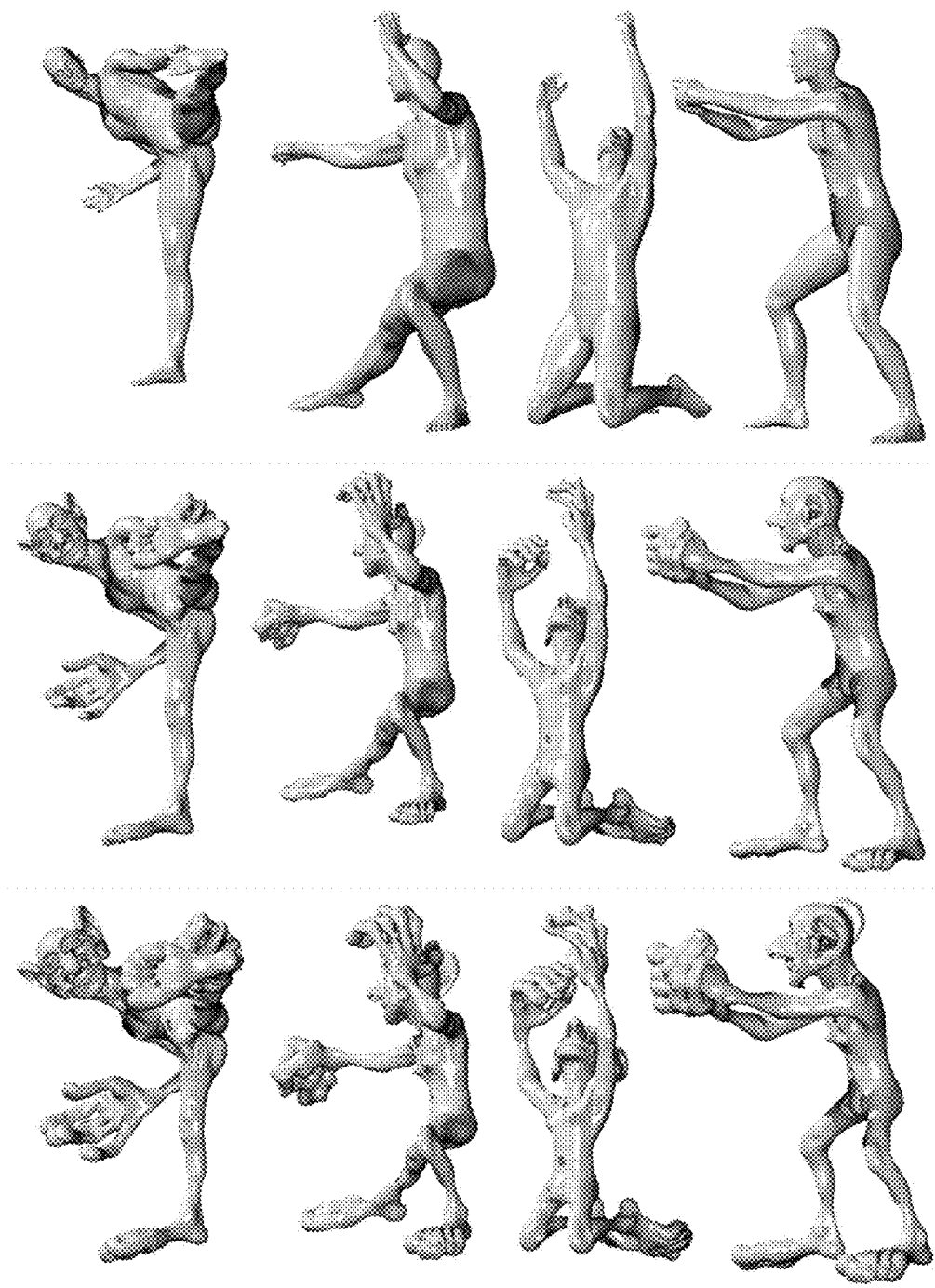
FIG. 13 shows the results of exemplary caricaturization of a martial artist 3D model, in four different poses.

FIGS. 11, 12 and 13 show examples of exaggerated shapes in various poses for different values of $\gamma$.

In FIG. 11, the top row shows original 3D models of a dog in four different poses. The bottom row shows caricatures of these four different poses with an exaggeration factor $\gamma=0.3$.

In FIG. 12, the top row shows original 3D models of a gymnast in four different poses. The middle row shows caricatures of these four different poses with an exaggeration factor $\gamma=0.3$. The bottom row shows caricatures of these four different poses with an exaggeration factor $\gamma=0.4$.

In FIG. 13, the top row shows original 3D models of a martial artist in four different poses. The middle row shows caricatures of these four different poses with an exaggeration factor $\gamma=0.3$. The bottom row shows caricatures of these four different poses with an exaggeration factor $\gamma=0.4$.

The Intrinsic Surface Caricaturization algorithm was successfully harnessed for the present audio-based caricaturization method. Artificial motion for the video sequence was generated by linearly interpolating between different caricaturized poses of the same object. This interpolation was then projected onto the space of isometries by solving a Poisson equation, as described in M. Botsch, R. Sumner, M. Pauly, M. Gross, "Deformation transfer for detail-preserving surface editing", in Vision, Modeling & Visualization, Citeseer, 2006, 357-364, and in R. W. Sumner, J. Popovic, "Deformation transfer for triangle meshes", in ACM Transactions on Graphics (TOG), Vol. 23, ACM, 2004, 399-405.

3.4 Shape Classification by Exaggeration

A prominent task in shape analysis is the ability of a computer to classify shapes. To facilitate this task, we have exaggerated the features of the query shapes as a preprocessing step before classification. This method is justified by an experiment which showed that humans perform better in memorizing and recognizing caricaturized faces than regular ones. That experiment is described in R. Kurzweil, "How to create a mind: The secret of human thought revealed", Penguin, 2012. Kurzweil mentions the ability of the brain to recognize the subject behind a caricature. That is, the human pattern recognition ability is robust to some classes of exaggerations.

We have successfully demonstrated the power of caricaturisation in facilitating recognition of 3D shapes that have undergone various almost-isometric deformations. First, we manually sampled points on quadruped mammals in various poses. These points included, for example, the tip of the tail, the tip of the nose, etc. of the mammal We then normalized the shapes and calculated the geodesic distances between every two points, forming a matrix sized approximately 30×30 for each shape. Each matrix was flattenned into an approximately 900-long vector. We then calculated the L2 distance between every two vectors, and placed the results in a matrix D. In order to represent each shape as a point in the plane, we calculated the Multidimentional Scaling of D to the plane. That is, we find the configuration of points in the plane between which the distances are as close as possible (in least squares sense) to the L2 distances between the representations of the shapes in the higher dimensional (900-long) space. We repeated the process after exaggerating the shapes.

The embeddings of the shapes to the plane are presented in FIGS. 14A-B and 15A-B. The exaggeration is shown to separate the mammal classes, making the classification task simpler.

Figure 14A:
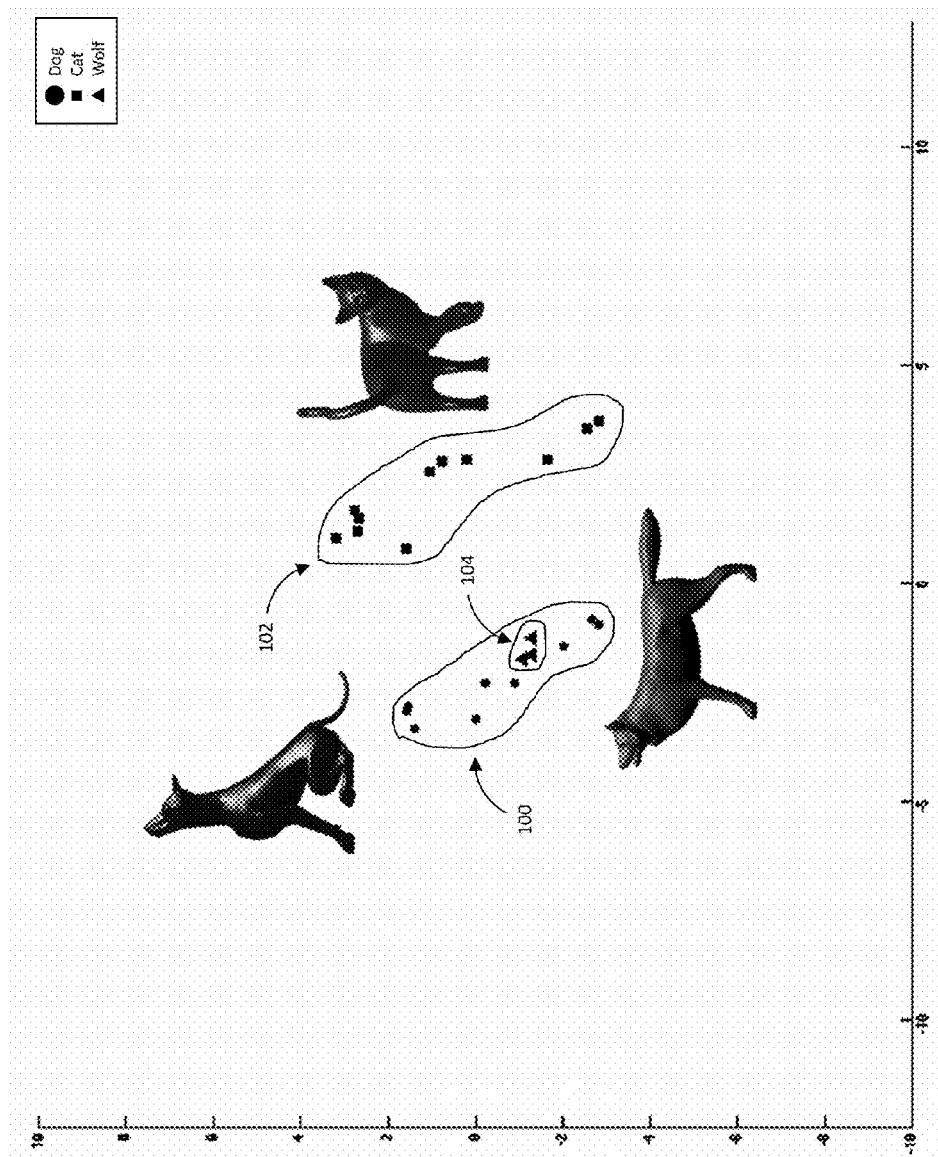
FIG. 14A shows the results of Multidimensional Scaling of geodesic distance matrices for uncaricaturized 3D shapes.

FIG. 14A shows a graph of the results of the Multidimentional Scaling for uncaricaturized versions of a dog, a cat and a wolf. Notably, a dog area 100 in the graph and a wolf area in the graph 104 greatly overlap, whereas a cat area 102 is relatively distinct from the previous two. This means that, in these uncaricaturized 3D models, distinguishing between models using the Multidimensional Scaling of the geodesic distance matrices would yield unsatisfactory results.

Figure 14B:
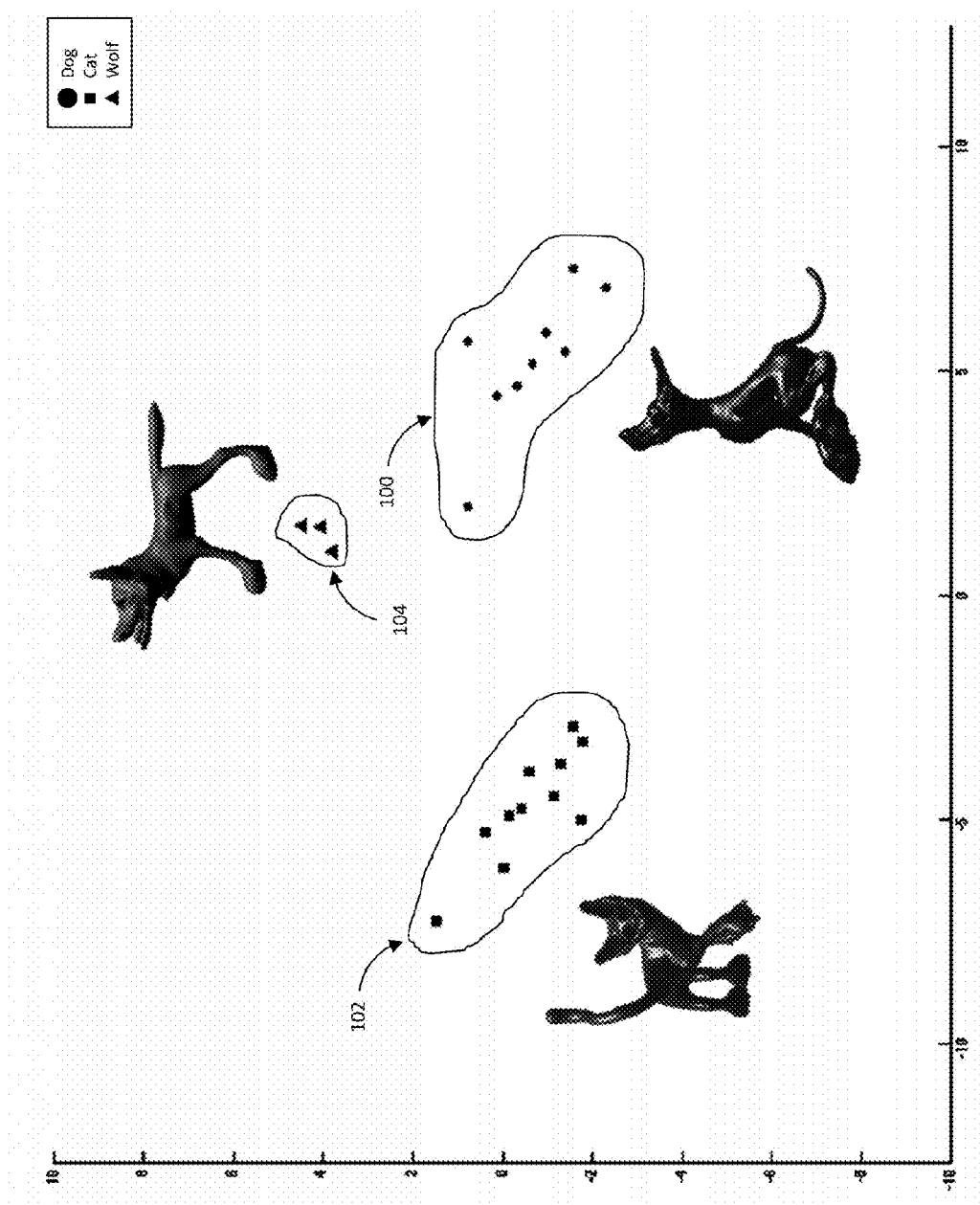
FIG. 14B shows the results of Multidimensional Scaling of geodesic distance matrices for caricaturized versions of the 3D shapes of FIG. 14A.

FIG. 14B shows a similar graph, this time for caricaturized versions ($\gamma=0.3$) of the dog, cat and wolf. As clearly seen in this figure, a dog area 200, a cat area 202 and a wolf area 204 are easily distinguishable using simple cartesian analysis of this graph. Here, the Multidimentional Scaling of the geodesic distance matrices has proven efficient in allowing for computerized classification of 3D shapes.

Figure 15A:
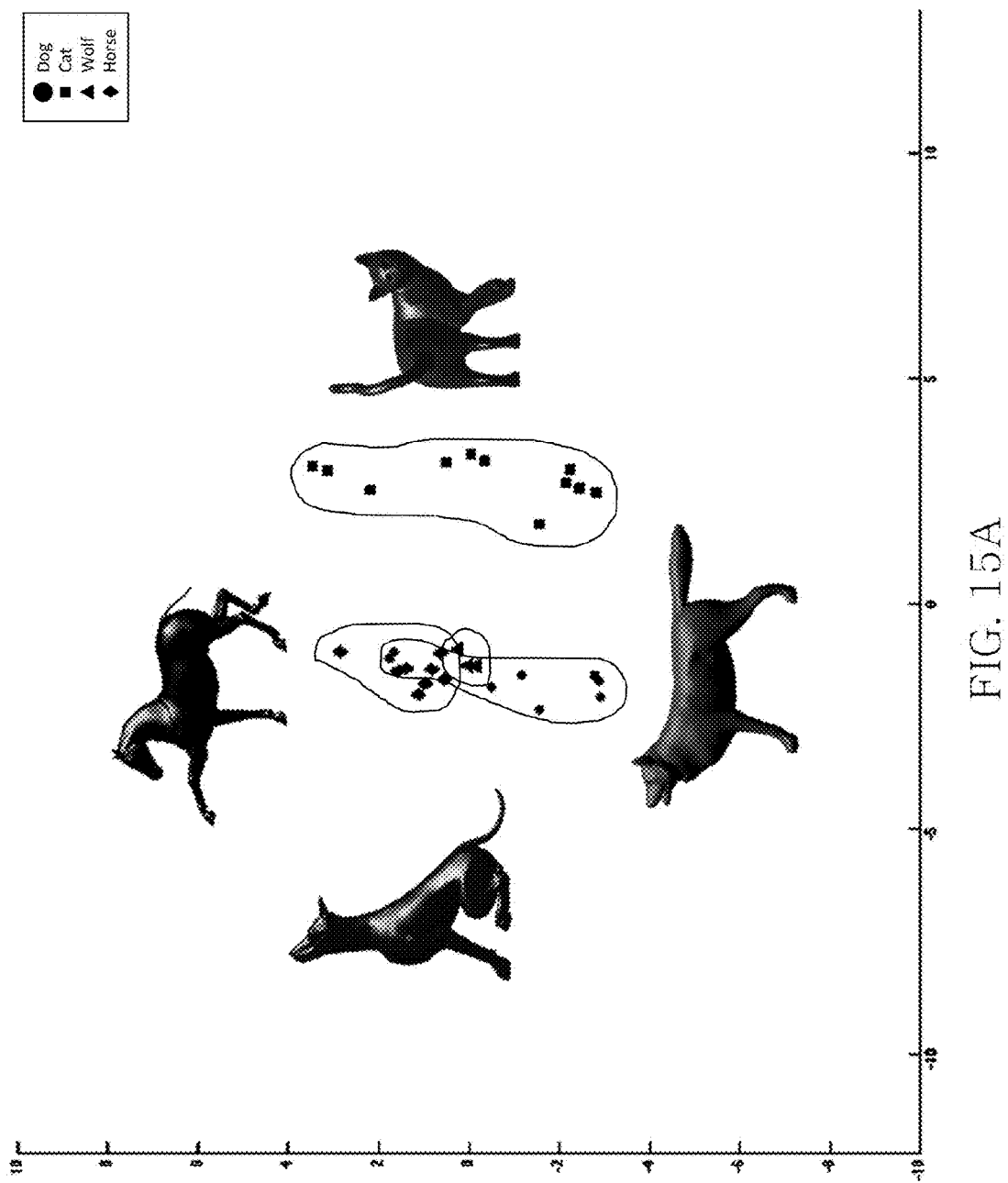

FIG. 15A is similar to the graph of FIG. 14A, but pertains to an added quadruped mammal—a horse. Here, again, distinguishing between the shapes is not feasible—especially between the dog, wolf and horse.

Figure 15B:
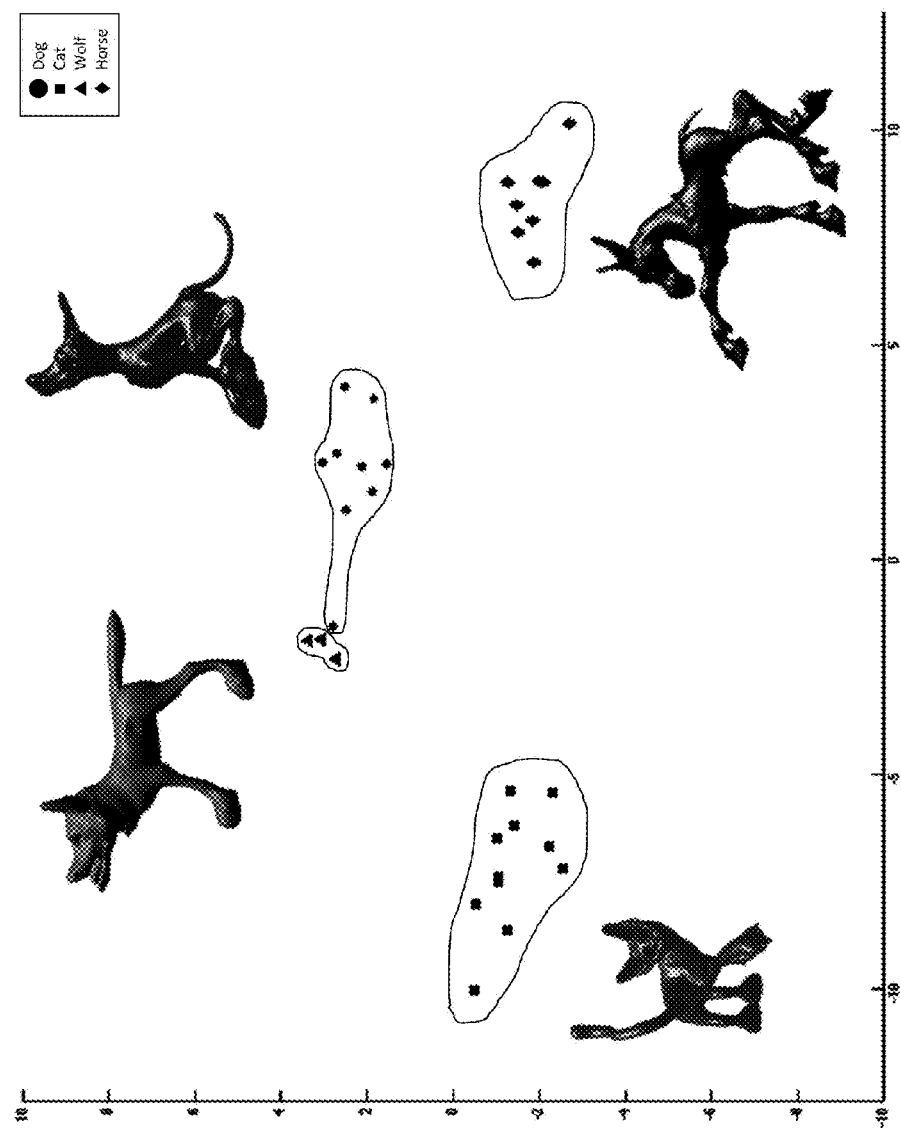
FIG. 15B shows the results of Multidimensional Scaling of geodesic distance matrices for caricaturized versions of the 3D shapes of FIG. 15A.

FIG. 15B shows the same dog, cat, wolf and horse—this time after caricaturization ($\gamma=0.3$). The Multidimentional Scaling of the geodesic distance matrices has proven efficient also here.

4.5 Application: Exaggeration Volume

The applicability of the Intrinsic Surface Caricaturization algorithm to the present audio-based caricaturization method was successfully tested, and a number of audiovisual clips were synthesized. We first constructed a look-up table of caricatures for equally sampled values of the exaggeration factor $\gamma \in [0,1]$. For each video frame, we calculated the mean absolute value volume of the audio within the corresponding time-frame of the audio sequence. Then, we found its closest exaggeration factor $\gamma$ in the look-up table and set the video frame to its corresponding rendered caricature. The resulting audiovisual clip showed a 3D shape caricaturized in synchronization with the played song.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising using at least one hardware processor for:
   receiving a three-dimensional model of an object, wherein the three-dimensional model is embodied as a digital file that comprises a representation of the object;
   receiving an audio sequence embodied as a digital file that comprises a musical composition;
   generating a video frame sequence, wherein the generating comprises computing a caricature of the object by applying a computerized caricaturization algorithm to the three-dimensional model, wherein the computing comprises:
      scaling gradient fields of surface coordinates of the three-dimensional model by a function of a Gaussian curvature of the surface,
      finding a regular surface whose gradient fields fit the scaled gradient fields, and
      amplifying the scaling according to local discrepancies between the object and a reference object, wherein the reference object is not a scaled down version of the object,
   wherein (a) the computing is with a different exaggeration factor for each of multiple ones of the video frames, and (b) the different exaggeration factor is based on one or more parameters of the musical composition of the audio sequence; and
   synthesizing the audio sequence and the video frame sequence into an audiovisual clip.

2. The method according to claim 1, further comprising using the at least one hardware processor for determining the one or more parameters for each of multiple periods of the audio sequence.

3. The method according to claim 2, wherein the one or more parameters are selected from the group consisting of: amplitude, frequency and tempo.

4. The method according to claim 1, wherein the generating further comprises altering a view angle of the caricature along the video frame sequence.

5. The method according to claim 1, wherein the exaggeration factor is applied uniformly, to the entirety of the three-dimensional model.

6. The method according to claim 1, wherein the exaggeration factor is applied non-uniformly, only to one or more portions of the three-dimensional model, which portions amount to less than the entirety of the three-dimensional model.

7. The method according to claim 1, wherein the computing of the caricature of the object comprises:
   constructing a look-up table comprised of (a) different visualizations of the caricature, each computed with one of the different exaggeration factors, and (b) the exaggeration factor for each of the different visualizations; and
   using each caricature visualization from the look-up table when the exaggeration factor of that caricature visualization is determined to be suitable for the one or more parameters of the audio sequence.

8. The method according to claim 1, wherein the computing of the caricature of the object further comprises amplifying the scaling according to local discrepancies between the object and a scaled down version of the object.

9. A computer program product comprising a non-transitory computer-readable storage medium having program code embodied thereon, the program code executable by at least one hardware processor for:
   receiving a three-dimensional model of an object, wherein the three-dimensional model is embodied as a digital file that comprises a representation of the object;
   receiving an audio sequence embodied as a digital file that comprises a musical composition;
   generating a video frame sequence, wherein the generating comprises computing a caricature of the object by applying a computerized caricaturization algorithm to the three-dimensional model, wherein the computing comprises:
      scaling gradient fields of surface coordinates of the three-dimensional model by a function of a Gaussian curvature of the surface,
      finding a regular surface whose gradient fields fit the scaled gradient fields, and
      amplifying the scaling according to local discrepancies between the object and a reference object, wherein the reference object is not a scaled down version of the object,
   wherein (a) the computing is with a different exaggeration factor for each of multiple ones of the video frames, and (b) the different exaggeration factor is based on one or more parameters of the musical composition of the audio sequence; and
   synthesizing the audio sequence and the video frame sequence into an audiovisual clip.

10. The computer program product according to claim 9, wherein:
   the program code is further executable by said at least one hardware processor for determining the one or more parameters for each of multiple periods of the audio sequence; and
   the one or more parameters are selected from the group consisting of: amplitude, frequency and tempo.

11. The computer program product according to claim 9, wherein the generating further comprises altering a view angle of the caricature along the video frame sequence.

12. The computer program product according to claim 9, wherein the computing of the caricature of the object further comprises amplifying the scaling according to local discrepancies between the object and a scaled down version of the object.

13. A system comprising:
   (a) a non-transitory computer-readable storage medium having program code embodied thereon, the program code comprising instructions for:
      receiving a three-dimensional model of an object, wherein the three-dimensional model is embodied as a digital file that comprises a representation of the object,
      receiving an audio sequence embodied as a digital file that comprises a musical composition,
      generating a video frame sequence, wherein the generating comprises computing a caricature of the object by applying a computerized caricaturization algorithm to the three-dimensional model, wherein the computing comprises:

scaling gradient fields of surface coordinates of the three-dimensional model by a function of a Gaussian curvature of the surface, finding a regular surface whose gradient fields fit the scaled gradient fields, and amplifying the scaling according to local discrepancies between the object and a reference object, wherein the reference object is not a scaled down version of the object, wherein (i) the computing is with a different exaggeration factor for each of multiple ones of the video frames, and (ii) the different exaggeration factor is based on one or more parameters of the musical composition of the audio sequence, and synthesizing the audio sequence and the video frame sequence into an audiovisual clip; and (b) at least one hardware processor configured to execute the instructions.

14. The system according to claim 13, wherein:

the program code is further executable by said at least one hardware processor for determining the one or more parameters for each of multiple periods of the audio sequence; and the one or more parameters are selected from the group consisting of: amplitude, frequency and tempo.

15. The system according to claim 13, wherein the generating further comprises altering a view angle of the caricature along the video frame sequence.

16. The system according to claim 13, wherein the computing of the caricature of the object further comprises amplifying the scaling according to local discrepancies between the object and a scaled down version of the object.

\* \* \* \* \*